(12) United States Patent
Takata et al.

(10) Patent No.: US 7,904,449 B2
(45) Date of Patent: Mar. 8, 2011

(54) CONTENT SEARCHING APPARATUS

(75) Inventors: Kazutoyo Takata, Osaka (JP); Takashi Tsuzuki, Osaka (JP); Kenji Mizutani, Nara (JP)

(73) Assignee: Panasonic Corporation, Osaka (JP)

( * ) Notice: Subject to any disclaimer, the term of this patent is extended or adjusted under 35 U.S.C. 154(b) by 406 days.

(21) Appl. No.: 12/095,167

(22) PCT Filed: Oct. 30, 2007

(86) PCT No.: PCT/JP2007/071118
§ 371 (c)(1),
(2), (4) Date: May 28, 2008

(87) PCT Pub. No.: WO2008/056570
PCT Pub. Date: May 15, 2008

(65) Prior Publication Data
US 2009/0313234 A1    Dec. 17, 2009

(30) Foreign Application Priority Data

Nov. 9, 2006   (JP) .................................. 2006-304455

(51) Int. Cl.
*G06F 7/00* (2006.01)
*G06F 17/30* (2006.01)
(52) U.S. Cl. ......... 707/722; 707/728; 707/732; 707/769; 707/771
(58) Field of Classification Search ........... 707/999.005, 707/722, 728, 732, 769, 771
See application file for complete search history.

(56) References Cited

U.S. PATENT DOCUMENTS

2006/0282258 A1   12/2006   Tsuzuki et al.

FOREIGN PATENT DOCUMENTS

| JP | 4-021056 | 1/1992 |
|---|---|---|
| JP | 2006-040266 | 2/2006 |
| WO | 2006/073095 | 7/2006 |

OTHER PUBLICATIONS

JPO Translation of WO2006/073095.*

* cited by examiner

*Primary Examiner* — Jay A Morrison
(74) *Attorney, Agent, or Firm* — Wenderoth, Lind & Ponack, L.L.P.

(57) ABSTRACT

A content searching apparatus facilitating a search of a content, which a user desires, even where relativity between a content and a keyword change, wherein the content searching apparatus includes: a content table storing unit storing content tables; an input unit obtaining a keyword, which has been selected as a selected keyword; a relevant keyword creating unit (i) calculating a relevance degree, for each of keywords, to the selected keyword, based on a target content table, (ii) selecting a keyword having a predetermined relevance degree out of each of the keywords, and (iii) creating a relevant keyword out of the corresponding keywords; and a variance calculating unit calculating a variance value of selected keywords including the keyword, when the user is confused. Further, the content searching apparatus includes a content table selecting unit changing the above mentioned target content table to another content table, when the variance value is larger than a threshold value.

10 Claims, 17 Drawing Sheets

FIG. 2

| | Content ID | Content name | Date | Keyword | Content outline |
|---|---|---|---|---|---|
| Content attribute | 1 | We love animals | 19:00, January 1st, 2006 | Spider Craw Mammoth | From mammoth to craw... |
| Content attribute | 2 | Fine goal | 21:00, January 1st, 2006 | Soccer Feature segment Digest | Here is a digest of last week's soccer matches... |
| | ⋮ | ⋮ | ⋮ | ⋮ | |

Service period January - June, 2005
Service period July - December, 2005
Service period January - June, 2006

|  | Content ID | Content name | Date | Keyword |
|---|---|---|---|---|
| Watch history attribute | 43 | Minami, Minami | 13:00, June 30th, 2005 | Minami Information Gourmet Summer |
| Watch history attribute | 68 | My dear Tamagawa-river | 22:30, July 3rd, 2005 | Maruko bridge Baseball Snake Japanese rice-fish |
| | ⋮ | ⋮ | ⋮ | ⋮ |

| Selection keyword | Keyword | Relevance degree |
|---|---|---|
| Matsushita Hanako | Matsushita Jiro<br>Cosmea<br>Flower field<br>.<br>.<br>. | 0.94<br>0.85<br>0.44<br>.<br>.<br>. |

FIG. 8

| Variance value / Number of keywords | Small | Large |
|---|---|---|
| Small | Confusion type A<br><br>Solution:<br>Target content table: Not to be changed<br>Relevance degree distribution: Increase keywords having a low relevance degree | Confusion type B<br><br>Solution:<br>Target content table: To be changed<br>Relevance degree distribution: Increase keywords having a high relevance degree |
| Large | Confusion type C<br><br>Solution:<br>Target content table: Not to be changed<br>Relevance degree distribution: Increase keywords having a high relevance degree | Confusion type D<br><br>Solution:<br>Target content table: To be changed<br>Relevance degree distribution: Increase keywords having a low relevance degree |

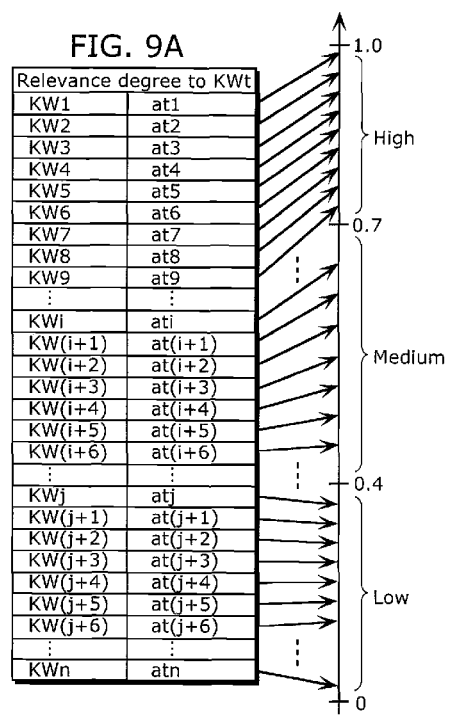

FIG. 12

| Selection keyword | Keyword | Relevance degree | |
|---|---|---|---|
| Matsushita Hanako | Matsushita Taro | 0.84 | High relevance degree |
| | Kyoto | 0.82 | |
| | Historical Drama | 0.81 | |
| | Temple | 0.79 | |
| | Samurai | 0.78 | |
| | Drama | 0.76 | |
| | Shogun | 0.75 | |
| | Tea ceremony | 0.75 | |
| | Whistle | 0.74 | |
| | War | 0.73 | |
| | Couple | 0.72 | |
| | History | 0.72 | |
| | ... | ... | |
| | Horse | 0.51 | Medium relevance degree |
| | Motorcycle | 0.43 | |
| | America | 0.41 | |
| | ... | ... | |
| | Matsushita Kenji | 0.31 | Low relevance degree |
| | Adolescence | 0.24 | |
| | Guitar | 0.22 | |
| | Teacher | 0.21 | |
| | Quiz | 0.21 | |
| | Baseball | 0.20 | |
| | ... | ... | |

FIG. 13

Content associated with "Matsushita Hanako"

- Content A: Outline···
- Content B: Outline···
- Content C: Outline···

Relevant keyword to "Matsushita Hanako"

- Matsushita Taro   · Kyoto   · Historical drama
- Horse   · Matsushita Kenji ( Help )

Content associated with "Matsushita Hanako"

- Content A: Outline···
- Content B: Outline···
- Content C: Outline···

Relevant keyword to "Matsushita Hanako"

- Temple   · America   · Motorcycle   · Guitar
- Teacher ( Help )

| Selection keyword | Keyword | Relevance degree |
|---|---|---|
| Matsushita Hanako | Matsushita Taro<br>Kyoto<br>Historical Drama<br>Temple<br>Samurai<br>Drama<br>Shogun<br>Tea ceremony<br>Whistle<br>War<br>Couple<br>History<br>... | 0.84<br>0.82<br>0.81<br>0.79<br>0.78<br>0.76<br>0.75<br>0.75<br>0.74<br>0.73<br>0.72<br>0.72<br>... |
| | Horse<br>Motorcycle<br>America<br>... | 0.51<br>0.43<br>0.41<br>... |
| | Matsushita Kenji<br>Adolescence<br>Guitar<br>Teacher<br>Quiz<br>Baseball<br>... | 0.31<br>0.24<br>0.22<br>0.21<br>0.21<br>0.20<br>... |

| Selection keyword | Keyword | Relevance degree | |
|---|---|---|---|
| Matsushita Hanako | Matsushita Kenji<br>Teacher<br>School<br>Love<br>Motorcycle<br>... | 0.89<br>0.84<br>0.81<br>0.80<br>0.73<br>... | High relevance degree |
| | Guitar<br>Basket ball<br>Shoe<br>Spain<br>... | 0.61<br>0.53<br>0.51<br>0.42<br>... | Medium relevance degree |
| | Ship<br>Music<br>... | 0.33<br>0.31<br>... | Low relevance degree |

FIG. 17

Content associated with "Matsushita Hanako"

· Content A: Outline···
· Content B: Outline···
· Content C: Outline···

Relevant keyword to "Matsushita Hanako"

· Matsushita Kenji   · Teacher   · School
· Love   · Spain                              ( Help )
                                                    |
                                                   Hb

FIG. 18

Content associated with "Matsushita Hanako"

· Content A: Outline···
· Content B: Outline···
· Content C: Outline···

Relevant keyword to "Matsushita Hanako"

· Temple   · Samurai   · Tea ceremony
· Whistle  · America                        ( Help )
                                                    |
                                                   Hb Content associated with "Matsushita Hanako"

·Content A: Outline···
·Content B: Outline···
·Content C: Outline···

Relevant keyword to "Matsushita Hanako"

·Teacher  ·Basketball  ·Shoe  ·Ship  ·Music

Hb

CONTENT SEARCHING APPARATUS

BACKGROUND OF THE INVENTION

1. Field of Invention

The present invention relates to a content searching apparatus that searches for a content, which a user intends to watch, out of a large number of contents, such that the search is based on a keyword selected by the user.

2. Description of the Related Art

Conventional content searching apparatuses create a list of contents (to be shown) matching a search keyword inputted by a user when the user searches an intended content to watch out of a large number of contents stored in a server and the like (See Patent reference 1, for example).

A content searching apparatus of the above Patent reference 1 searches a content using an input keyword of a user and an additional synonym, using a thesaurus. This enables the user to search to watch an intended content even though the input keyword of the user and a keyword which the desired content has do not match completely. Thus, the content searching apparatus of the above Patent reference 1 is useful when searching the desired content out of a large number of contents since the content searching apparatus can conduct the search even where the user has vague memory of the desired content.

In addition, another content searching apparatus, showing keywords for a search to narrow contents, has been proposed (See Patent reference 2, for example).

On the content searching apparatus in the above Patent reference 2, the user narrows the contents by repeating an operation for selecting an interesting keyword out of displayed keywords, and then obtains the desired content. More specifically, this content searching apparatus creates a suitable keyword to the situation which the user is currently in according to an environmental situation, a preference, and characteristics of the user when creating a keyword for searching a restaurant. For example, this content searching apparatus first displays a location based on the user's present position (such as Umeda and Shinsai-bashi) as a keyword, and then displays kinds of cuisines served at the location as keywords (such as the Italian food and the Japanese food). This can (i) create a personalized keyword to a user according to the user's searching situation and (ii), even when the user's searching objective is unclear, provide the desired content since the user's watching object is clarified by repeating the selection of the created keyword.

[Patent reference 1] Japanese Unexamined Patent Application Publication No. 04-21056.
[Patent reference 2] Japanese Unexamined Patent Application Publication No. 2006-40266.

BRIEF SUMMARY OF THE INVENTION

Problems that Invention is to Solve

Unfortunately, the content searching apparatuses in the above Patent references 1 and 2 have a problem in that a content which the user desires cannot be easily searched when relativity between a content and a keyword, such as a TV program and the relevant keyword, momentarily changes.

In the content searching apparatus of Patent reference 2, for example, a significance change of relativity is not observed between the restaurant information regarded as a content to be searched and a keyword. In other words, even though there are search keywords, such as location, cuisine, and budget, the number and the kind of these keywords are limited. Thus, no change is observed in the relativity between the restaurant information and the keywords. That is why the content searching apparatus in the Patent reference 2 facilitates the search of the restaurant information which the user desire, using the keywords.

In the case where a TV program is a content to be searched, however, new TV programs are momentarily stored in a server, and the number of TV programs chosen as search candidates and the keywords increase to be numerous. Along with the increase in the TV programs chosen as search candidates, a change of relativity is observed between each of the TV programs and associated keywords. For example, in the case where a keyword "Actor A" is related only to a TV program "Drama A", the user can use the keyword "Actor A" to easily search the TV program "Drama A". Once Actor A starts to appear in many TV programs, however, the keyword "Actor A" has relevance to the many TV programs. A user, who does not comprehend such a situation change, cannot easily find the TV program "Drama A" when trying to search the TV program, using the keyword "Actor A" as described above since there are so many TV programs related to the keyword "Actor A".

Hence, in the conventional content searching apparatus, a discrepancy occurs between: the relativity between each TV programs and associated keywords which the user assumes; and the relativity between each TV programs and associated keywords which the content searching apparatuses assume, in the case where the relativity between the content and the keyword changes. This confuses the user since the user fails to facilitate the search of the desired content.

Thus, the present invention is conceived in view of the above problems and has as an objective to facilitate a search of a content which a user desires even where relativity between a content and a keyword changes.

Means to Solve the Problems

In order to achieve the above objectives, a content searching apparatus which searches for a content in a form of electronic data based on a keyword selected by a user includes: a content table storing unit which stores content tables associating, to show, identification information with a keyword associated with each of contents, the identification information identifying each of the contents; an input unit which designates, as a target content table, a content table selected out of the content tables, and to obtain, as a selection keyword, a keyword selected out of the keywords shown in the target content table by an input operation of the user; a relevant keyword creating unit which calculates a relevance degree based on correspondence relationship between each of pieces of the identification information and each of keywords shown in the target content table, and to select a keyword having a predetermined relevance degree out of each of the keywords, so that the selected keyword is created as a relevant keyword, the relevance degree being for each of the keywords to the selection keyword; an output displaying unit which searches the target content table for identification information associated with the selection keyword to display the identification information, and to display the relevant keyword so that the relevant keyword can be selected by an input operation on the input unit; a confusion receiving unit which receives information indicating that the user is in confusion; a variance calculating unit which calculates a variance degree of selection keywords including the selection keyword, using each of relevance degrees between the selection keywords obtained by the input unit as a scale, in the case where the confusion receiving unit receives the information indicating the confusion from the user; and a content table selecting unit which selects a content table other than the target content table from the content table storing unit in the case where the variance degree is larger than a variance threshold value, and to set the selected content table as a new target content table.

This allows the relevant keyword displayed by the output displaying unit to be displayed so as to be able to be selected by the input unit. Thus, the user can operate the input unit: to select a relevant keyword to designate the relevant keyword as a new selection keyword; and to select identification information associating with the new selection keyword, namely, a content.

Further, since one of the content tables is designated as a target content table, and the relevant keyword to the selection keyword is created, using correspondence relationship between the identification information, such as a content ID and a content name, and the keyword shown in the target content table (a content matrix, for example), an appropriate relevant keyword to the target content table can be created.

If a relevance degree of each keyword to the selected keyword is calculated based on the correspondence relationship between identification information and keywords shown in all of the content tables, the relevance degree of each keyword to be calculated will be lowered. That is, differences between the relevance degrees of each of the keywords can be difficult to be found, since the identification information and the keywords are numerous. Thus, a relevant keyword, created with the relevance degrees of each of the keywords mentioned above, is not what the user desires. Since showing all of identification information and keywords of all of contents from a distant past to now, a conventional content table for a content such as a TV program cannot appropriately display a relevant keyword which the user desires.

The present invention then: designates just one of the content tables as a target, as mentioned above; and can create an appropriate relevant keyword without lowering the relevant degree of each content. As a result, the user can: select a relevant keyword which the user desires; and facilitate a search for a desired content.

Moreover, in the present invention, a target content table is changed when: the user gets confused when selecting a content during a content search, repeatedly selecting a relevant keyword; and the variance degree of selected relevance keywords; namely selection keywords, is large. Consequently, relevancy (correspondence relationship) between each of the contents (identification information) and each of keywords and relevancy (correspondence relationship) between each of the contents created by the target content table (identification information) and each of the keywords can correspond. This allows the relevance degree of each of the keywords to the selection keyword to be calculated as the user assumes, and an appropriate relevant keyword to the user can be created.

In other words, the fact that the selection keywords have a large variance degree of means that the user has selected relevant keywords each of which has a small relevance degree. Meanwhile, the user usually tries to select a relevant keyword which the user assume to have a high relevance degree to the selected keyword. Thus, when the variance degree of the selected keyword is higher, the relevance degree assumed by the user does not correspond with the relevance degree shown in the target content table. That is to say, the relevancy between each of the contents and each of the keywords which the user assumes and the relevancy between each of the content and each of the keywords formed by the target content table do not correspond.

Such discrepancy occurs in the case where when relevancy between a content and a keyword changes, such as a content as a TV program.

Thus, by changing a target content table, the present invention can create an appropriate relevant keyword for the user to facilitate a search for a content which the user desires, even where relevancy between a content and a keyword changes.

The content searching apparatus may further include: a counting unit which counts the number of the selection keywords obtained by the input unit in the case where the confusion receiving unit receives the information indicating the confusion from the user; and an adjusting unit which adjusts the number of selection keywords including the selected keyword selected by the relevant keyword creating unit based on the number of the selection keywords counted by the counting unit, the keywords each having the predetermined relevance degree.

This allows the number of relevant keywords, having a high relevance degree and the number of relevant keywords having a low relevance degree which are displayed on the output displaying unit, to be adjusted based on the number of relevant keyword (in other words, selection keywords) selected until the user gets confused, so that relevant keywords having a relevance degree, which the user desires, can be displayed many.

The content searching apparatus may further include: a profile information storing unit which stores profile information indicating a preference of the user, wherein said content table selecting unit may select a content table associated with the preference of the user indicated in the profile information. For example, each of the content tables stored in the content table storing unit shows the identification information indicating contents which are provided during a same period and the keyword, each of the content tables covering a different period, and the content table selecting unit selects a content table associated with the preference of the user indicated in the profile information.

This allows a content table, associated with the preference of the user indicated in the profile information, to be selected as a new target content table, so that a target content table definitely to solve the above discrepancy can be set.

Note that the present invention can be realized not only as a content searching apparatus mentioned above, but also as a method, a program and a storing medium to store the program, thereof.

Effects of the Invention

The content searching apparatus in the present invention is effective in facilitating a search of a content which a user desires even where relativity between a content and a keyword changes.

BRIEF DESCRIPTION OF DRAWINGS

FIG. 2 is a diagram showing an example of a content table in the above content searching apparatus.

FIG. 3 is a diagram showing an example of profile information in the above content table.

FIG. 7 is a diagram detailing the relevance degree calculated by the relevant keyword creating unit in the above content searching apparatus.

FIG. 8 is an explanatory diagram describing confusion types identified by a confusion type identifying unit in the above content searching apparatus.

FIG. 9A is an explanatory diagram describing relevance degree distribution adjusted by a distribution adjustment setting unit in the above content searching apparatus.

FIG. 9B is an explanatory diagram describing the relevance degree distribution adjusted by the distribution adjustment setting unit in the above content searching apparatus.

FIG. 9C is an explanatory diagram describing the relevance degree distribution adjusted by the distribution adjustment setting unit in the above content searching apparatus.

FIG. 9D is an explanatory diagram describing the relevance degree distribution adjusted by the distribution adjustment setting unit in the above content searching apparatus.

FIG. 12 is a diagram showing a detailed example of relevance degrees to respective keywords in the above embodiment of the present invention.

FIG. 13 is a diagram detailing an example of content names and relevant keywords displayed by the above content searching apparatus.

FIG. 14 is a diagram detailing an example of relevant keywords distributed after a confusion type A included in the above confusion types is identified.

FIG. 16 is a diagram detailing an example of the relevance degrees to the respective keywords being recalculated.

FIG. 17 is a diagram detailing an example of relevant keywords displayed after a confusion type B included in the above confusion types is specified.

FIG. 18 is a diagram detailing an example of relevant keywords displayed after a confusion type C included in the above confusion types is specified.

DETAILED DESCRIPTION OF THE INVENTION

A content searching apparatus in an embodiment of the present invention shall be described, referring the drawings, hereinafter.

Figure 1:
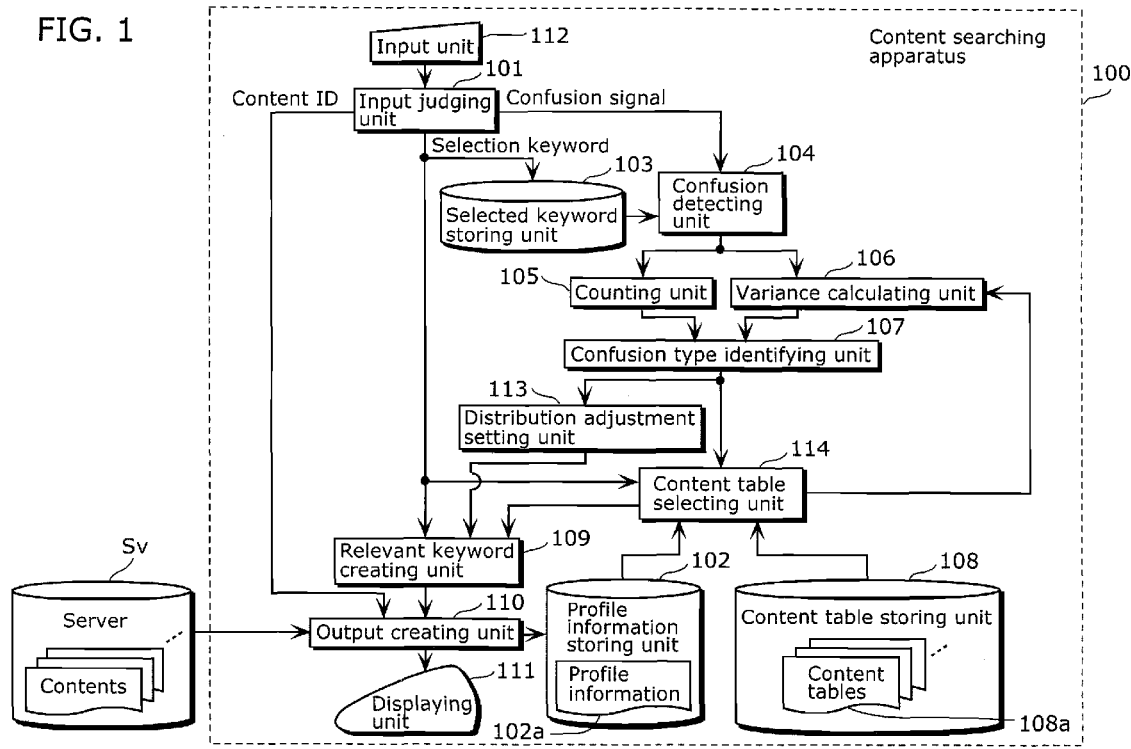
FIG. 1 is a block diagram showing a structure of a content searching apparatus in an embodiment of the present invention.

FIG. 1 is a block diagram showing a structure of the content searching apparatus in the embodiment of the present invention.

A content searching apparatus 100 in the embodiment facilitates a search of a content, which a user desires, out of contents, using a keyword selected by the user and a relevant keyword associated with the keyword. Here, the contents are a large number of TV programs accumulated in a server Sv. In addition, the content searching apparatus 100 facilitates the search of the content which the user desires even where relativity changes between the content and the keyword.

The content searching apparatus 100 includes an input judging unit 101, a profile information storing unit 102, a selection keyword storing unit 103, a confusion detecting unit 104, a counting unit 105, a variance calculating unit 106, a confusion type identifying unit 107, a content table storing unit 108, a relevant keyword creating unit 109, an output creating unit 110, a displaying unit 111, an input unit 112, a distribution adjustment setting unit 113, and a content table selecting unit 114.

The content table storing unit 108 stores content tables 108a indicating an attribute such as a name, an outline, and a keyword of the content (referred to as a content attribute, hereinafter) for each of the contents accumulated in the server Sv. Each of the content tables 108a is created per predetermined period (referred to as a service period, hereinafter) and then stored. For example, the stored are: a content table 108a indicating content attributes of the contents broadcasted during a service period in January through June, 2006; and a content table 108a indicating content attributes of the contents broadcasted during a service period in July through December, 2005. Note that such content tables 108a are created, for example, using the EPG (Electronic Program Guide).

The profile information storing unit 102 stores profile information 102a showing a content watch history of the user.

The input unit 112 receives operations by the user, and then outputs the operation result to the input judging unit 101. The user operates the input unit 112 to: select a name and a keyword of the content displayed on the displaying unit 111; and notify the content searching apparatus 100 of the fact that the user is confused selecting the content. For example, the user notifies the content searching apparatus 100 of the fact that the user-self is in confusion, selecting a help button displayed on the displaying unit 111.

The input judging unit 101 judges the operation result outputted from the input unit 112 indicating which of the following: the name of the selected content, the selected keyword, or the fact that the user is in the confusion. Then, when the operation result indicates the keyword, the input judging unit 101 outputs the keyword to the selection keyword storing unit 103 and to the relevant keyword creating unit 109 as the selection keyword. Meanwhile, when the operation result indicates the name of the selected content, the input judging unit 101 outputs the content ID of the content to the output creating unit 110. In addition, this causes the input judging unit 101 to judge that the content search ends, and to delete all of selection keywords stored in the selection keyword storing unit 103. Further, the input judging unit 101 outputs a confusion signal to the confusion detecting unit 104 when the operation result indicates the notification of the confusion.

Note that an input unit is structured of the input unit 112 and the input judging unit 101 in the embodiment.

The selection keyword storing unit 103 stores the selection keyword outputted from the input judging unit 101. This selection keyword storing unit 103 stores only a selection keyword selected through a search conducted per content. In other words, selection keywords stored in the selection keyword storing unit 103 are deleted every time a content search ends.

The confusion detecting unit 104 is structured as a confusion receiving unit, and detects the fact that the user is in the confusion searching the content when receiving the confusion signal from the input judging unit 101. As a result, the confusion detecting unit 104 reads out all of the selection keywords stored in the selection keyword storing unit 103, and then outputs the selection keywords to the counting unit 105 and the variance calculating unit 106.

The counting unit 105 counts the number of the selection keywords (referred to as the number of keywords, hereinafter) obtained from the confusion detecting unit 104. Then, the counting unit 105 outputs information on the number of keywords, representing the number of keywords, to the confusion type identifying unit 107.

In the case where several keywords are obtained from the confusion detecting unit 104, the variance calculating unit 106 calculates after-mentioned cosine distance between each of the selection keywords. Then, the variance calculating unit 106 calculates a variance value of the selection keywords, using the cosine distance as a scale, and then outputs variance information showing the variance value to the confusion type identifying unit 107.

The confusion type identifying unit 107, structured as a confused state judging unit, identifies a type of confusion which the user is in (referred to as a confusion type, hereinafter), using the information on keyword outputted from the counting unit 105 and the variance information outputted from the variance calculating unit 106. In other words, the confusion type identifying unit 107 compares the number of keywords which the information on number of keywords shows with a predetermined threshold value (a threshold value of the number of keywords). As a result, the confusion type identifying unit 107 judges whether or not the number of keywords equals to the threshold value or more; that is, whether or not the number of keywords is large or small. In addition, the confusion type identifying unit 107 compares the variance value which the variance information shows with a predetermined threshold value (a variance threshold value). As a result, the confusion type identifying unit 107 judges whether or not the variance value equals to the threshold value or more; that is, the variance value is large or small. In other words, the confusion type identifying unit 107 judges whether the selection keywords each of which has either a low relevance degree or a high relevance degree. Then, as the result of the above judgment, in other words, based on whether the number of keywords is large or small and whether the variance value is large or small, the confusion type identifying unit 107 identifies the confusion type.

Hence, the confusion type identifying unit 107 outputs the specified confusion type to the distribution adjustment setting unit 113 and to the content table selecting unit 114.

The distribution adjustment setting unit 113, structured as an adjusting unit, sets distribution (relevance degree distribution, hereinafter) for the selection keyword selected last (most recently) by the user. Here, the distribution represents: the number of keywords each of which has a high relevance degree; the number of keywords each of which has a moderate relevance degree; and the number of keywords each of which has a low relevance degree. In an initial state, for example, the distribution adjustment setting unit 113 sets relevance degree distribution=(5,3,2) showing the number of keywords having a high relevance degree "5", the number of keywords having a moderate relevance degree "3", and the number of keywords having a low relevance degree "2". Then, the distribution adjustment setting unit 113 outputs distribution information, showing the set relevance degree distribution, to the relevant keyword creating unit 109.

Here, when the confusion type is not obtained from the confusion type identifying unit 107, specifically, in the above initial state, a predetermined relevance degree distribution ((5,3,2), for example) is set. Meanwhile, when obtaining the confusion type from the confusion type identifying unit 107, the distribution adjustment setting unit 113 adjusts the above relevance degree distribution to reset, based on the confusion type. Then, the distribution adjustment setting unit 113 outputs the distribution information showing the adjusted relevance degree distribution to the relevant keyword creating unit 109.

In the initial state, that is, when the confusion type is not obtained from the confusion type identifying unit 107, the content table selecting unit 114 selects a table having the most recent service period out of the content tables 108a stored in the content table storing unit 108, and outputs the selected content table 108a to the relevant keyword creating unit 109 and the variance calculating unit 106 as a target content table In addition, when obtaining the confusion type from the confusion type identifying unit 107, the content table selecting unit 114: selects any one of given content tables 108a stored in the content table storing unit 108 based on the confusion type, the profile information 102a, and the most recently selected selection keyword by the user; and then outputs the selected content table 108a to the relevant keyword creating unit 109 and to the variance calculating unit 106 as a new target content table. In other words, the content table selecting unit 114 changes the target content table 108a, used in the relevant keyword creating unit 109 and the variance calculating unit 106, based on the obtained confusion type.

Note that the content table selecting unit 114 in the embodiment, selecting any one of given content tables 108a stored in the content table storing unit 108, may select the profile information 102a as the new content table.

When the selection keyword is not obtained from the input judging unit 101, the relevant keyword creating unit 109 selects as many keywords as the displaying unit 111 can display out of keywords shown in the target content table 108a, based on a predetermined scheme. Then, the relevant keyword creating unit 109 outputs the selection keywords to the output creating unit 110 as initial keywords. For example, the relevant keyword creating unit 109 selects genres including "sport", and "Documentary" as the initial keywords. Note that the relevant keyword creating unit 109 may select associated keywords with a content having a high watch frequency of the user as the initial keywords, based on the profile information 102a.

When the selection keyword is obtained from the input judging unit 101, the relevant keyword creating unit 109 calculates relevance degrees of other keywords associated with the selection keyword, using a content matrix based on contents and the keywords shown in the target content table 108a. Then, according to the relevance degrees calculated above and the relevance degree distribution shown in the distribution information outputted from the distribution adjustment setting unit 113, the relevant keyword creating unit 109 selects a keyword out of the target content table 108a to create the relevant keyword out of the selected keyword. The relevant keyword creating unit 109 outputs the relevant keyword and the selection keyword to the output creating unit 110.

Note that the relevant keyword creating unit 109 outputs to the output creating unit 110 the content table 108a obtained from the content table selecting unit 114.

When obtaining the content ID from the input judging unit 101, the output creating unit 110 obtains a content identified with the content ID from the server Sv, and outputs to the displaying unit 111. This allows the user to watch the content displayed by the displaying unit 111. Further, the output creating unit 110: creates a content watch history obtained from the server Sv based on the target content table 108a selected by the content table selecting unit 114; and adds the content watch history to the profile information 102a stored in the profile information storing unit 102.

When the selection keyword is obtained from the relevant keyword creating unit 109, the output creating unit 110 outputs a name and an outline of a content to the displaying unit 111 along with the selection keyword. Here, the content is in the content attribute, of the target content table 108a, including the selection keyword as a keyword.

When obtaining the initial keywords or the related keyword from the relevant keyword creating unit 109, the output creating unit 110 outputs the initial keywords or the relevant keyword to the displaying unit 111.

When obtaining the content from the output creating unit 110, the displaying unit 111 reproduces the content to display. Moreover, when obtaining the initial keywords from the output creating unit 110, the displaying unit 111 displays the initial keywords. When obtaining the selection keyword, the relevant keyword, the name of the content, and the outline of the content from the output creating unit 110, the displaying unit 111 display those on the same monitor.

Note that an output displaying unit is structured of the output creating unit 110 and the displaying unit 111 in the embodiment.

FIG. 2 is a drawing showing an example of the content tables 108a.

Each of the content tables 108a shows a content attribute of each of contents broadcasted during, for example, a six-month service period. The content attribute includes the content ID which is information for identifying the content, the content name (the name and the title of the content), the date which the broadcasting (distribution) of the content started, a keyword which belongs to the content, and the content outline showing the summary and the outline of the content.

For example, a content table 108a shows content attributes of broadcasted contents in a service period "January through June, 2006". The content table 108a show that a content indicated with the content ID "2": has the content name "We love animals"; was broadcasted date at "19:00, Jan. 1, 2006"; has "spider, craw, and mammoth" as the keywords; and has "From a mammoth to a craw . . . " as the content outline.

FIG. 3 is a diagram showing an example of the profile information 102a.

The profile information 102a shows an attribute of a watched content (referred to as a watch history attribute) as a watch history. The watch history attribute includes, for example, a content ID and a content name which are information for identifying a watched content (the name and the title of the content), a date which the content was watched, and a keyword which belongs to the content.

When the content is obtained from the server Sv to be outputted to the displaying unit 111, the output creating unit 110 specifies the content name, the date which the content was watched, and the keyword of the outputted content, based on the content ID obtained from the input judging unit 101 and the target content table 108a selected by the content table selecting unit 114.

Then, the output creating unit 110 additionally records the content ID, the specified content name, the date and time, and the keyword in the profile information 102a, stored in the profile information storing unit 102, as the above watch history attribute.

As a watch history attribute, for example, the output creating unit 110 records the following: the content ID "68"; the content name "My dear Tamagawa-river"; the date and time "22:30, Jul. 3, 2005"; and the keywords "Maruko bridge, baseball, snake, and Japanese rice-fish".

As described above, the output creating unit 110 enables a preference of the user to be always reflected on the profile information 102a by recording the watch history attribute in the profile information 102a every time a content is reproduced to display.

Figure 4:
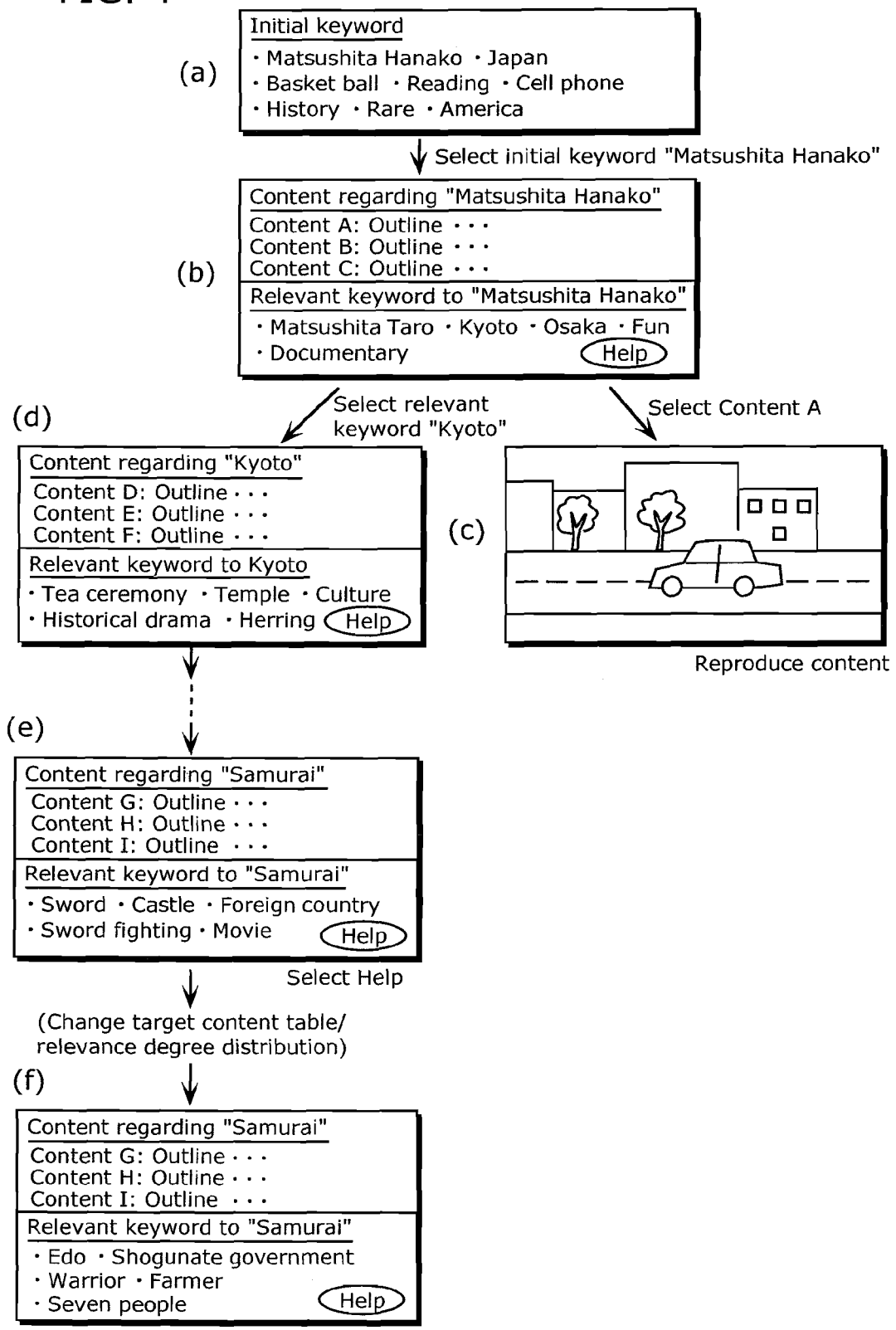
FIG. 4 is a diagram describing an outline of operations in the above content searching apparatus.

Here, an outline of operations of the content searching apparatus 100 in the embodiment is described, using FIG. 4.

FIG. 4 is a diagram describing the outline of the operations in the content searching apparatus 100.

First, as shown in FIG. 4 (a), this content searching apparatus 100 displays predetermined initial keywords "Matsushita Hanako, Japan, basketball, Reading, Cell phone, History, Rare, and America." Such initial keywords are displayed on the displaying unit 111, and any one of given initial keywords is selected by the user operating the input unit 112.

Here, the user selects one of the initial keywords "Matsushita Hanako". As shown in FIG. 4 (b), the content searching apparatus 100 displays: content names and content outlines of contents regarding the selection keyword "Matsuhsita Hanako"; relevant keywords to the selection keyword "Matsuhita Hanako", and the help button notifying that the user is in confusion searching the content. For example, "Content A: Outline . . . , Content B: Outline . . . , and Content C: Outline . . . " are displayed as the content names and the content outlines, and "Matsushita Taro, Kyoto, Osaka, Fun, and Documentary" as the relevant keywords.

In other words, out of the content names and the content outlines included in the target content table 108a, the content searching apparatus 100 displays, on the displaying unit 111, content names and content outlines in the content attribute including the selection keyword "Matsushita Hanako" as the keyword. Then, the content searching apparatus 100: selects keywords relevant to the selection keyword "Matsushita Hanako" as relevant keywords out of the respective keywords included in the target contents table 108a; and displays on the displaying unit 111. Here, the relevant keywords are selected based on: relevance degrees of each of the keywords, included in the target content table 108a, to the selection keyword "Matsushita Hanako"; and predetermined and set relevance degree distribution.

Here, when finding the name of a desired content out of the displayed content names and content outlines, the user operates the input unit 112 to select the name of the desired content; that is, to select the desired content.

For example, when the content name "Content A" is selected, the content searching apparatus 100, as shown in FIG. 4 (c), obtains to reproduce the content having the content name from the server Sv, and then displays on the displaying unit 111. This ends the search of the content.

Meanwhile, when finding no name of the desired content out of the displayed content names, the user operates the input unit 112 to select a relevant keyword, assumed to associate with the desired content out of the displayed relevant keywords, as a new selection keyword.

When a relevant keyword "Kyoto" is selected as the new keyword, for example, as shown in FIG. 4 (d), the content searching apparatus 100 displays: content names and content outlines of contents regarding the selection keyword "Kyoto"; relevant keywords to the selection keyword "Kyoto"; and the help button described above. For example, "Content D: Outline . . . , Content E: Outline . . . , and Content F: Outline . . . " are displayed as the content names and the content outlines, and "Tea ceremony, Temple, Culture, Historical drama, and Herring" as the relevant keywords.

In other words, out of the content names and the content outlines included in the target content table 108a, the content searching apparatus 100 displays, on the displaying unit 111, content names and content outlines in the content attribute including the selection keyword "Kyoto" as the keyword.

Then, the content searching apparatus 100: selects keywords relevant to the selection keyword "Kyoto" as relevant keywords out of each of the keywords included in the target contents table 108*a*; and displays on the displaying unit 111. Here, the relevant keywords are selected based on: relevance degrees of the associated keywords, included in the target content table 108*a*, to the selection keyword "Kyoto"; and predetermined and set relevance degree distribution.

Note that the content searching apparatus 100 does not narrow the contents names in order to display the content names as described above. Instead, the content searching apparatus 100 conducts an AND search for the latest selection keyword "Kyoto" and the previously selection keyword "Matsushita Hanako". In other words, out of the content names in the target content table 108*a*, the content searching apparatus 100 displays, on the displaying unit 111, content names in the content attribute including the selection keyword "Kyoto" as the latest keyword, regardless of whether or not the selection keyword has been selected before.

When finding no name of the desired content out of the displayed content names on the displaying unit 111, the user repeatedly selects the relevant keywords as described above. In other words, the user searches the desired content interactively, repeatedly selecting the relevant keywords. Note that the content searching apparatus 100 sequentially displays a new relevant keyword, by the user repeating the selection of relevant keywords, and does not display the previously displayed relevant keywords again. The fact that the previously displayed relevant keywords are not selected by the user shows that the relevant keywords are not the user's desired keywords. Hence, the content searching apparatus 100 displays a keyword which has not displayed yet as a relevant keyword, instead of displaying again the previously displayed relevant keywords.

As the result of repeatedly selecting the relevant keywords, for example, as shown in FIG. 4 (*e*), the content searching apparatus 100 displays: content names and content outlines of contents regarding a selection keyword "Samurai"; relevant keywords to the selection keyword "Samurai", and the help button described above. For example, "Content G: Outline . . . , Content H: Outline . . . , and Content I: Outline . . . " are displayed as the content names and the content outlines, and "Sword, Castle, Foreign country, Sword fighting and Movie" as the relevant keywords.

Here, even though the contents names are displayed as shown in FIG. 4 (*e*), the user gets confused since a desired content name is not displayed. Then, the user operates the input unit 112 to select the help button.

With the help button selected, the content searching apparatus 100 detects the fact that the user is having the confusion selecting a content. Then, the content searching apparatus 100 in the embodiment changes at least one of the target content table 108*a* and the relevance degree distribution for creating the relevant keywords.

Based on a result of the change, the content searching apparatus 100 selects (creates) again a keyword relevant to the selection keyword "Samurai" as a relevant keyword out of each of the keywords included in the target content table 108*a*, and displays the relevant keyword on the displaying unit 111. For example, as shown in FIG. 4 (*f*), different keywords from the previously displayed relevant keyword are displayed; namely, "Edo, Shogunate government, Warrior, Farmer, and Seven people".

As described above, the content searching apparatus 100 of the embodiment is characterized in changing at least one of the target content table 108*a* and the relevance degree distribution to recreate the relevant keywords when the help button is selected, that is, the user is in confusion.

Further, the content searching apparatus 100 enables the user to easily select the desired content by repeatedly selecting the relevant keywords even where the user does not know an immediately relevant keyword to the user's desired content.

Figure 5:
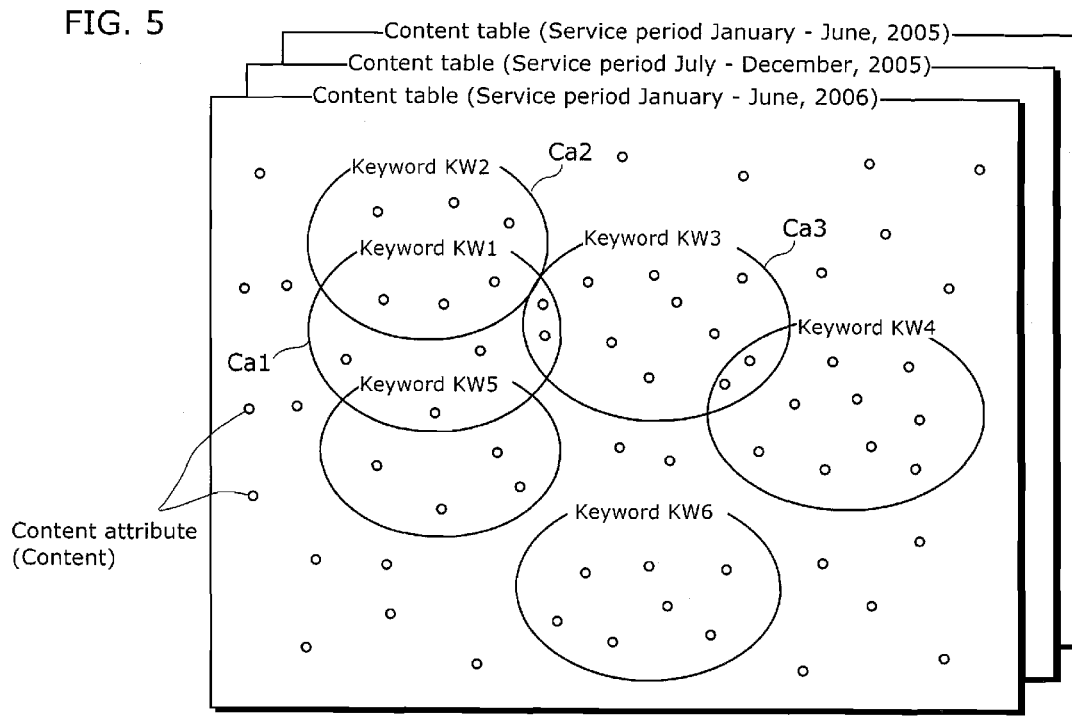
FIG. 5 is a diagram describing a relationship between an attribute of the content table and a keyword in the above content searching apparatus.

FIG. 5 is a diagram describing a relationship between a content attribute and a keyword in each of the content tables 108*a*.

As shown in FIG. 2, the content table 108*a* includes content attributes associated with respective contents. Each of the content attributes includes keywords. In other words, the content attributes in the content table 108*a* are classified by keyword.

As shown in FIG. 2, for example, content attributes shown in the service period in January through June, 2006 on the content table 108*a* are classified into: content attributes including a keyword KW1 (a content attribute group Ca1); content attributes including a keyword KW2 (a content attribute group Ca2); and content attributes including a keyword KW3 (a content attribute group Ca3). Moreover, one content attribute possibly belongs to two or more of the content attribute groups.

The content searching apparatus 100 in the embodiment regards the latest (the service period "January through June, 2006", for example) content table 108*a* as a target content table when the help button is not selected, that is, at ordinary times. Then, out of the content attributes shown in the target content table 108*a*, the content searching apparatus 100 searches a content attribute associated with the selection keyword, and then displays content names included in the content attribute. Furthermore, the content searching apparatus 100 displays a relevant keyword associated with the selection keyword.

When, the user operates the input unit 112 to select the keyword KW1 as the selection keyword, for example, the content searching apparatus 100 searches content attributes which belong to the content attribute group Ca1, and then displays content names included in the respective content attributes. Furthermore, the content searching apparatus 100 selects to display the keywords KW2, KW3, and KW5 which are associated with the selection keyword KW1 as relevant keywords. Moreover, when the user operates the input unit 112 to select the relevant keyword KW3, as a new selection keyword, out of the relevant keywords KW2, KW3, and KW5, the content searching apparatus 100 searches content attributes which belong to the content attribute group Ca3, and then displays content names included in the respective content attributes. In addition, the content searching apparatus 100 selects to display the keyword KW4 associated with the selection keyword KW3 as a new relevant keyword.

As described above, when the user selects the relevant keyword (the selection keyword), the content searching apparatus 100 in the embodiment displays a content name associated with the selection keyword in the target content table 108*a* and a relevant keyword associated with the selection keyword. Then, per selection of the relevance keyword, the content searching apparatus 100 regards the selected relevant keyword as a new selection keyword, and then displays a new content name corresponding to the new selection keyword and a new relevant keyword associated with the new selection keyword. This allows the content searching apparatus 100 in the embodiment to switch from one content attribute group to another content attribute group according to a keyword selected by the user, the contents which include content attributes. Note that in the content searching apparatus 100 in the embodiment, each of relevant keywords does not require that each of relevant keywords is included in a selection keyword. Thus, the content searching apparatus 100 does not proactively use the relevant keyword to narrow the contents corresponding to the selection keyword.

In addition, based on the confusion type identified by the confusion type identifying unit 107, the content searching apparatus 100 in the embodiment switches from the target content table 108a to another content table 108a. By the content searching apparatus 100, for example, the target content table 108a can be switched from the content table 108a associated with the service period in "January through June, 2006" to the content table 108a associated with the service period in "July through December, 2005".

In other words, as described above, the content table selecting unit 114 selects any one of given content tables 108a, out of the content tables 108a stored in the content table storing unit 108, as a new target content table, based on the profile information 102a and the latest selection keyword. Specifically, the content table selecting unit 114 specifies, in the profile information 102a, a period during which the selection keyword frequently appears. Then, the content table selecting unit 114 selects a content table 108a associated with the period as a new target content table.

As a result, the content name associated with the selection keyword and the relevance degrees of other respective keywords to the selection keyword are changed, and then a content name and a relevant keyword can be displayed according to a period which the user is interested in.

Figure 6:
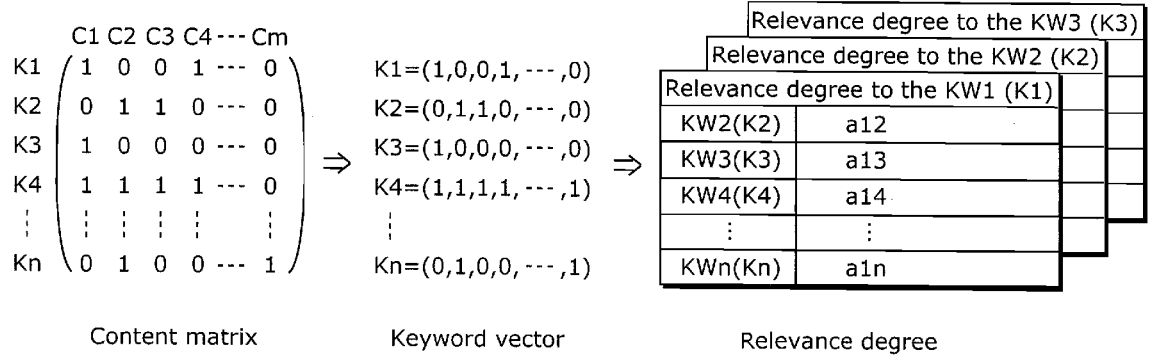
FIG. 6 is an explanatory diagram describing a calculation scheme of a relevance degree by a relevant keyword creating unit in the above content searching apparatus.

FIG. 6 is an explanatory diagram describing a calculation scheme of a relevance degree by the relevant keyword creating unit 109.

The relevant keyword creating unit 109, first, creates a content matrix based on the target content table 108a outputted from the content table selecting unit 114. In the content matrix, keywords shown in the target content table 108a are associated with respective lines K1, K2, K3 . . . , Kn, and content attributes shown in the target content table 108a are associated with respective columns C1, C2, C3, . . . , Cm.

An element (Ki, Cj) included in the content matrix is set to "1" when a keyword in a line Ki is included in a content attribute in a column Cj, and is set to "0" when the keyword in the line Ki is not included in the content attribute in a column Cj. Note that i represents an integer from 1 to n, and j represents an integer from 1 to m. For example, in the case where a keyword in a line K1 is included only in a content attribute in columns C1 and C4, the line K1 in the content matrix represents (1,0,0,1, . . . , 0).

Then, the relevant keyword creating unit 109 regards the respective lines K1, K2, K3, . . . , Kn in the content matrix as keyword vectors. In other words, all the keywords KW1, KW2, KW3 . . . , KWn shown in the target content table 108a are represented as keyword vectors K1, K2, K3, . . . , Kn, respectively.

Next, the relevant keyword creating unit 109 calculates each of cosine distances of the respective keyword vectors K1, K2, K3 . . . , Kn as relevance degrees of other keywords to a selection keyword. When the selection keyword is KW1, for example, the relevant keyword creating unit 109 calculates a cosine distance between the keyword vectors K1 and K2, a12, as a relevance degree to the KW1 which is the selection keyword of the keyword KW2. The relevant keyword creating unit 109 calculates as well a cosine distance between the keyword vectors K1 and K3, a13, as a relevance degree to the KW1 which is the selection keyword of the keyword KW3.

Note that since all elements in the content matrix shown in FIG. 6 become nonnegative, the cosine distance to be the relevance degree is represented by a number between 0 and 1. A value closer to 1 represents a stronger association between the keywords, and a value closer to 0 a weaker association.

As described above, the relevant keyword generating unit 109 calculates the relevance degrees of the other keywords to the selection keyword, and then selects a relevant keyword to the selection keyword. This is how the relevant keyword is created.

FIG. 7 is a diagram detailing the relevance degree calculated by the relevant keyword generating unit 109.

When obtaining the selection keyword "Matsushita Hanako" from the input judging unit 101, for example, the relevant keyword creating unit 109 calculates a relevance degree "0.94" by calculating a cosine distance between a keyword vector representing the selection keyword "Matsushita Hanako", and a keyword vector representing another keyword "Matsushita Jiro". Furthermore, the relevant keyword creating unit 109 calculates a relevance degree "0.85" by calculating a cosine distance between the keyword vector representing the selection keyword "Matsushita Hanako" and a keyword vector representing another keyword "Cosmea".

Note that when calculating cosine distances between the selection keywords stored in the selection keyword storing unit 103, the variance calculating unit 106 calculates the cosine distances, using a similar scheme to the scheme which the above relevance keyword creating unit 109 employs. In other words, the variance calculating unit 106 creates the content matrix based on the target content table 108a selected by the content table selecting unit 114, and then creates associated keyword vectors representing the above selection keywords, respectively. Then, the variance calculating unit 106 calculates a variance value of the selection keywords by calculating the cosine distances between each keyword vectors and using each of the cosine distances as a scale.

In the embodiment, the relevance degrees, of each of the keywords, to the selection keyword are calculated by using the target content table only, instead of using all of the information stored in the content table storing unit 108. Suppose all the information in the content table storing unit 108 is used. Then, relevance between the content and the keyword is to be poor. In other words, the keyword for selecting the content has low specificity. Since the user selects a content either without a thorough consideration or with a specific content in mind, considering a keyword of the content. Thus, when the relevance between the content and the keyword is poor, finding the content in mind, using a relevant keyword of the content, becomes impossible. In the embodiment, on the other hand, the relevance degrees of each of the keywords are calculated, using only the target content table corresponding to a specific service period, as described above. In the service period, therefore, appropriate relevance degrees to each of the keywords can be calculated with the relevance between the content and the keyword remained intact, and a relevant keyword which the user desires can be created. As a result, the user can easily search the desired content.

Note that in the case where the number of the contents increases with new contents momentarily stored in the server Sv, the information stored in the content table storing unit 108 is renewed, as well. Then, in the above case, the number of the content tables 108a stored in the content table storing unit 108 increases with the number of the content attributes included in one content table 108a limited to be equal to or less than a predetermined number. Hence, in the predetermined service period, the relevance between the content and the keyword remains intact even though the number of the contents in the server Sv increases. Thus, the relevant keyword which the user desires can always be created.

FIG. 8 is an explanatory diagram describing confusion types identified by the confusion type identifying unit 107.

The confusion type identifying unit 107 identifies any one of four confusion types A, B, C, and D to be the type of confusion which the user is facing, using the information on the number of the keywords outputted from the counting unit 105 and the variance information outputted from the variance calculating unit 106.

In other words, the confusion type identifying unit 107 identifies the confusion type A when: the information on the number of keywords shows "the number of keywords: small"; and the variance information shows "variance value: small". Specifically, the confusion type A is identified in the case where: the number of selection keywords selected by the user and stored in the selection keyword storing unit 103 is small; and the variance value of the selection keywords is small, in other words, relevance degrees between each of the selection keywords are high.

Here, in the case where the confusion type A confuses the user searching a content, the confusion is expected to be solved by adjusting the relevance degree distribution, so that relevant keywords, each of which has a low relevance degree, can be displayed many.

Thus, when the confusion type A is specified, the distribution adjustment setting unit 113 adjusts the relevance degree distribution, so that the number of keywords having a low relevance degree can increase. Note that, here, the content table selecting unit 114 does not change the target content table 108a.

In the meantime, when the information on the number of keywords shows: "the number of keywords: small"; and the variance information shows "the variance value: large", the confusion type identifying unit 107 identifies the confusion type B. Specifically, the confusion type B is specified in the case where: the number of selection keywords selected by the user and stored in the selection keyword storing unit 103 is small; and the variance value of the selection keywords is large, in other words, relevance degrees between each of the selection keywords are low.

Here, in the case where the confusion type B gives the user a confusion searching a content, the confusion is expected to be solved by adjusting the relevance degree distribution, so that relevant keywords, having a high relevance degree, can be displayed large in number.

Thus, when the confusion type B is identified, the content table selecting unit 114 changes the target content table 108a from the content table 108a corresponding to the latest service period to a content table 108a corresponding to a past service period. Furthermore, the distribution adjustment setting unit 113 adjusts the relevance degree distribution, so that the number of keywords having a high relevance degree can increase.

Then, when the information on the number of keywords shows: "the number of keywords: large"; and the variance information shows "the variance value: small", the confusion type identifying unit 107 identifies the confusion type C. Specifically, the confusion type C is identified in the case where: the number of selection keywords selected by the user and stored in the selection keyword storing unit 103 is large; and the variance values of the selection keywords are small, in other words, relevance degrees between each of the selection keywords are high.

Here, in the case where the confusion type C confuses the user searching a content, the confusion is expected to be solved by adjusting the relevance degree distribution, so that relevant keywords, having a high relevance degree, can be displayed large in number.

Thus, when the confusion type C is specified, the distribution adjustment setting unit 113 adjusts the relevance degree distribution, so that the number of keywords having a low relevance degree can increase. Note that, here, the content table selecting unit 114 does not change the target content table 108a.

Then, when the information on the number of keywords shows: "the number of keywords: large"; and the variance information shows "the variance value: large", the confusion type identifying unit 107 identifies the confusion type D. Specifically, the confusion type D is identified in the case where: the number of selected keywords selected by the user and stored in the selected keyword storing unit 103 is large; and the variance value of the selection keywords is large, in other words, relevance degrees between each of the selection keywords are low.

Here, in the case where the confusion type D confuses the user searching a content, the confusion is expected to be solved by changing the target content table 108a, so that relevant keywords, having a low relevance degree, can be displayed large in number.

Thus, when the confusion type D is identified, the content table selecting unit 114 changes the target content table 108a from the content table 108a corresponding to the latest service period to a content table 108a corresponding to a past service period. Furthermore, the distribution adjustment setting unit 113 adjusts the relevance degree distribution, so that the number of keywords having a low relevance degree increases.

FIGS. 9A to 9D are explanatory diagrams describing the relevance degree distribution adjusted by the distribution adjustment setting unit 113.

As shown in FIG. 9A, for example, the relevant keyword creating unit 109 calculates relevance degrees of the other keywords KW1, KW2, . . . KWn to the selection keyword KWt; namely, at1, at2, . . . , atn. Here, when: a relevance degree is below 0.4, the relevance degree is considered to be low (a low relevance degree); a relevance degree is equal to 0.4 or larger and below 0.7, the relevance degree is considered to be medium (a medium relevance degree); and a relevance degree is equal to 0.7 or higher, the relevance degree is considered to be high (a high relevance degree).

At ordinary times; that is, when obtaining a confusion type, the distribution adjustment setting unit 113 assigns relevance degree distribution showing that the number of keywords: having a high relevance degree is five; having a medium relevance degree is three; and having a low relevance degree is two, as shown in FIG. 9B.

As a result, the relevant keyword creating unit 109 selects, out of the keywords shown in FIG. 9A, five relevant keywords having a high relevance degree, three relevant keywords having a medium relevance degree, and two relevant keywords having a low relevance degree, all of which have not selected yet. To be more specific, the relevant keyword creating unit 109, as shown in FIG. 9B, selects keywords as relevant keywords: having a high relevance degree, KW1, KW2, KW3, KW4, and KW5; having a medium relevance degree, KWi, KW(i+1), and KW (i+2); and having a low relevance degree, KWj, and KW(j+1), respectively.

Meanwhile, when obtaining the confusion types B and C, the distribution adjustment setting unit 113 assigns relevance degree distribution showing that the number of keywords:

having a high relevance degree is eight; having a medium relevance degree is one; and having a low relevance degree is one, as shown in FIG. 9C.

As a result, the relevant keyword creating unit 109 selects, out of the keywords shown in FIG. 9, eight relevant keywords having a high relevance degree, one relevant keywords having a medium relevance degree, and one relevant keywords as having a low relevance degree, all of which have not selected yet. To be more specific, the relevant keyword creating unit 109, as shown in FIG. 9C, selects keywords as relevant keywords: having a high relevance degree, KW6, KW7, KW8, KW9, KW10, KW11, KW12, and KW13; having a medium relevance degree, KW(i+3); and having a low relevance degree, KW(j+2), respectively.

Meanwhile, when obtaining the confusion types A and D, the distribution adjustment setting unit 113 assigns relevance degree distribution showing that the number of keywords: having a high relevance degree is two; having a medium relevance degree is three; and having a low relevance degree is five, as shown in FIG. 9D.

As a result, the relevant keyword creating unit 109 selects the following out of the keywords shown in FIG. 9A: two relevant keywords as having a high relevance degree; three relevant keywords as having a medium relevance degree; and five relevant keywords as having a low relevance degree. To be more specific, the relevant keyword creating unit 109, as shown in FIG. 9D, selects keywords as relevant keywords: having a high relevance degree, KW6 and KW7; having a medium relevance degree, KW(i+3), KW (i+4), and KW (i+5); and keywords having a low relevance degree, KW(j+2), KW(j+3), KW(j+4), KW(j+5), and KW(j+6), respectively.

In the embodiment, as described above, by adjusting the relevance degree according to a confusion type, the relevant keywords, having the relevance degree which the user desires, can be displayed large in number. Thus, the user can easily search the desired content.

Figure 10:
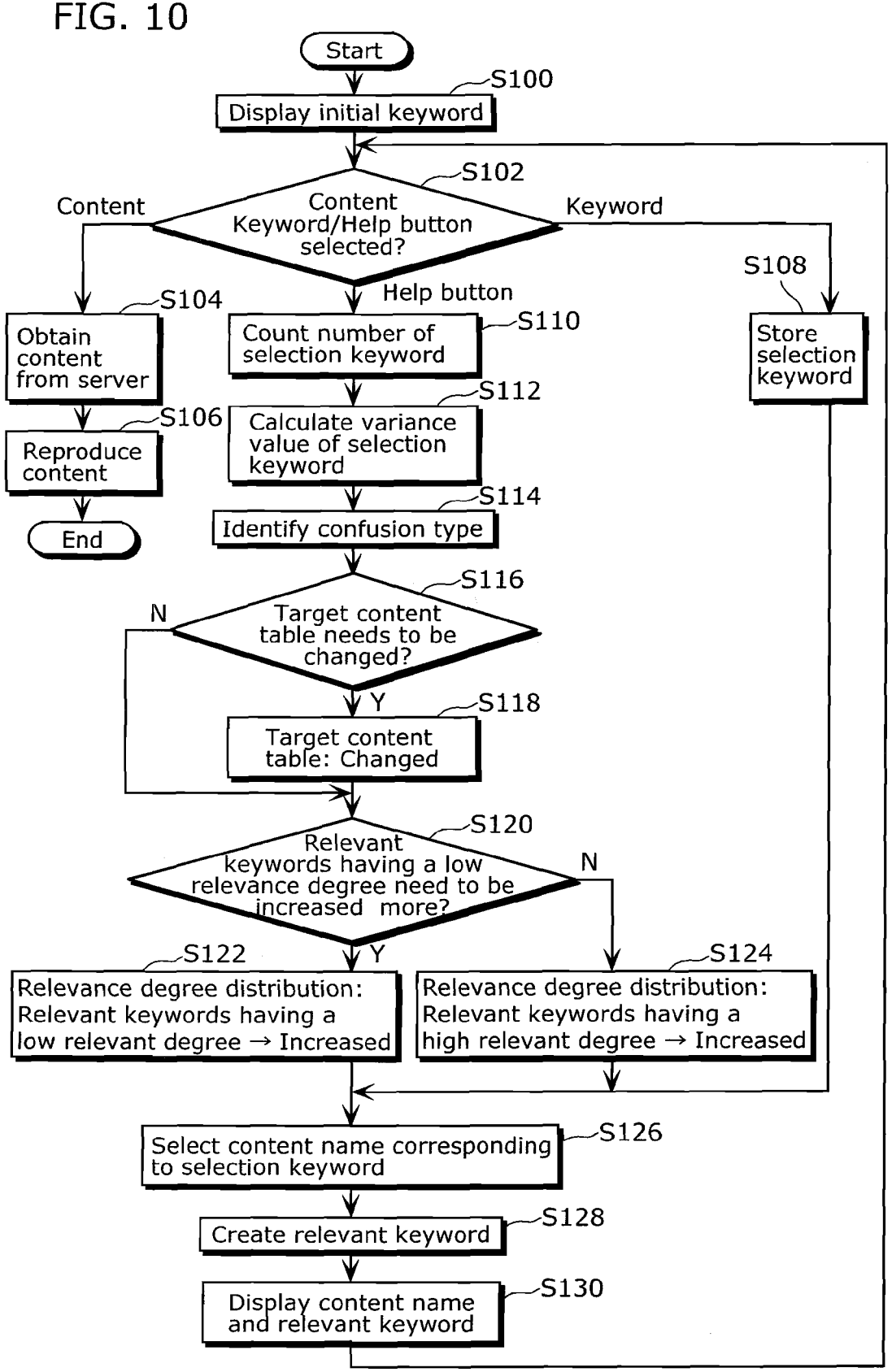
FIG. 10 is a flowchart showing operations of the above content searching apparatus.

FIG. 10 is a flowchart showing operations of the content searching apparatus 100 in the embodiment.

First, according to a predetermined scheme, the content searching apparatus 100 selects keywords out of the keywords shown in the target content table 108a, and then displays the selected keywords as initial keywords (Step S100).

Next, based on the operation result to the input unit 112 by the user, the content searching apparatus 100 identifies which one of the following is selected: a content (a content name); a keyword; or the help button (Step S102). Note that immediately after the initial keywords are displayed in the Step S100, the content searching apparatus 100 judges that any of the initial keywords has been selected. Performing an input operation of the input unit 112, the user makes the above described selection of the content name, the initial keywords, and the help button displayed on the displaying unit 111.

Here, when judging that the content is selected (the content in the Step 102), the content searching apparatus 100 requests the server Sv, so that the selected content is obtained (Step S104). Then, the content searching apparatus 100 reproduces the content (Step S106).

Meanwhile, when judging that keywords (either the initial keywords or the relevant keywords) are selected in the Step S102, the content searching apparatus 100 stores the keywords, which are selected, as the selection keywords into the selection keywords storing unit 103 (Step S108). Further, the content searching apparatus 100 selects a content name corresponding to the selection keywords out of the target content table 108a (Step S126). In addition, based on the relevance degree distribution and the target content table 108a, the content searching apparatus 100 creates a relevant keyword which is associated with the selection keywords (Step S128). Then, the content searching apparatus 100 displays the content name selected in the Step S126 and the relevant keyword created in the Step S128 (Step S130).

Meanwhile, when judging that the help button is selected in the Step S102 (the help button in the Step S102), the content searching apparatus 100 counts the number of the selection keywords stored in the selection keyword storing unit 103 (the number of keywords) (Step S110), and then calculates a variance value of the selection keywords (Step S112). Then, based on the number of keywords counted in the Step S110 and the variance value calculated in the Step S112, the content searching apparatus 100 identifies the user's confusion type when searching the content (Step S114). For example, the content searching apparatus 100 identifies any of the four confusion types A, B, C, and D.

Based on the confusion type specified in the Step S114, the content searching apparatus 100 judges whether or not the target content table 108a needs to be changed (Step S116).

For example, the content searching apparatus 100 judges: to change the content table 108a in the case where either the confusion type B or D is specified in the Step S114; and not to change the content table 108a in the case where either the confusion type A or C is specified in the Step S114.

Here, when judging the target content table 108a to be changed (Y: Step S116), the content searching apparatus 100 changes the target content table 108a (Step S118). Specifically, the content searching apparatus 100 selects a content table 108a corresponding to the profile information 102a out of the content tables 108a stored in the content table storing unit 108, and then changes the currently assigned target content table 108a to the selected content table 108a.

Furthermore, based on the confusion type specified in the Step S114, the content searching apparatus 100 judges whether or not the relevant keywords having a low relevance degree need to be increasingly displayed (Step S120). In other words, the content searching apparatus 100 specifies how to adjust the currently assigned relevance degree distribution. To be specific, the content searching apparatus 100 judges the relevance degree distribution to be adjusted either: in order for the keywords having a low relevance degree to be increasingly distributed; or, on the contrary, in order for the keywords having a high relevance degree to be distributed large in number. For example, the content searching apparatus 100 judges that: the relevant keywords having a low relevance degree need to be increasingly displayed when either the confusion type A or D is specified in the Step S114; and the relevant keywords having a high relevance degree need to be displayed large in number when either the confusion type B or C is specified in the Step S114.

Here, when judging the relevant keywords having a low relevance degree to be increasingly displayed (Y: Step S120), the content searching apparatus 100 adjusts the relevance degree distribution, so that the keywords having a low relevance degree can be increasingly distributed (Step S122). For example, the content searching apparatus 100 adjusts the currently assigned relevance degree distribution=(5,3,2) to relevance degree distribution=(2,3,5) Meanwhile, when judging the relevant keywords having a high relevance degree to be increasingly displayed (N: Step S120), the content searching apparatus 100 adjusts the relevance degree distribution, so that the keywords having a high relevance degree can be distributed more (Step S124). For example, the content searching apparatus 100 adjusts the currently assigned relevance degree distribution=(5,3,2) to relevance degree distribution=(8,1,1).

Upon adjusting the relevance degree, the content searching apparatus 100 selects a content name corresponding to the latest selection keyword out of the target content table 108a as described above (Step S126), and then creates a relevant keyword which is associated with the selection keyword (Step S128). Then, the content searching apparatus 100 displays the content name selected in the Step S126 and the relevant keyword created in the Step S128 (Step S130).

When the content name and the relevant keyword are displayed in the Step S130, the content searching apparatus 100 again repeatedly executes the processing starting at the Step S102.

Here, specific operations of the content searching apparatus 100 in the embodiment when identifying either the confusion types A, B, C, or D shall be described with detailed examples.

Figure 11:
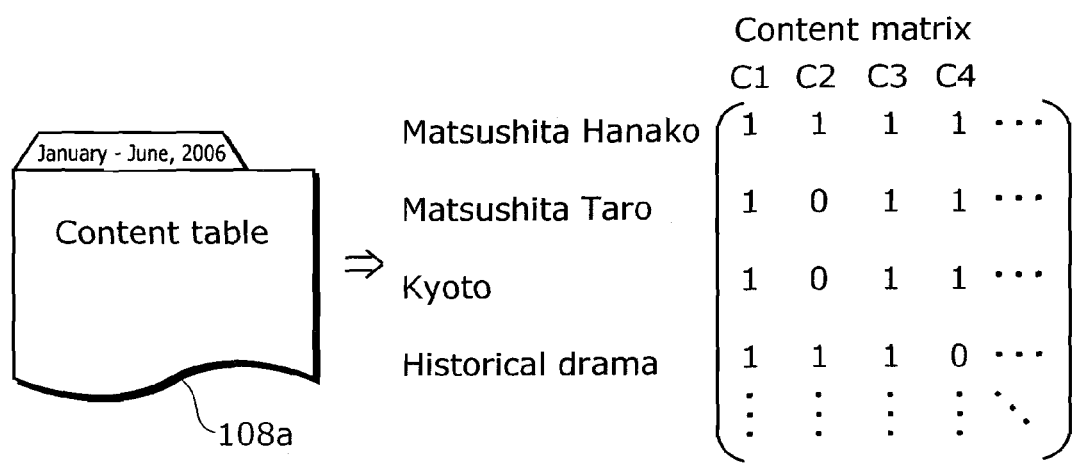
FIG. 11 is a drawing detailing an example of a content matrix in the above content searching apparatus.

FIG. 11 is a drawing detailing an example of a content matrix.

The content searching apparatus 100 creates a content matrix as shown in FIG. 11, for example. Specifically, the content searching apparatus 100 regards the latest (the service period "January through June, 2006", for example) content table 108a as a target content table, and generates the content matrix out of the target content table 108a. In the content matrix, each of keywords shown in the target content table 108a (Matsushita Hanako, Matsushita Taro, Kyoto, and Historical drama) is associated with respective lines, and content attributes shown in the target content table 108a are associated with respective columns C1, C2, C3, . . . .

FIG. 12 is a diagram showing a detailed example of relevance degrees to respective keywords.

As shown in FIG. 12, the content searching apparatus 100 calculates the relevance degrees of respective keywords to the selection keyword "Matsushita Hanako", using the content matrix shown in FIG. 11. In other words, the content searching apparatus 100 regards each of the lines in the content matrix shown in FIG. 11 as a keyword vector representing each of the keywords. Then, the content searching apparatus 100 calculates the relevance degrees of the respective keywords by calculating cosine distances between a keyword vector representing the selection keyword "Matsushita Hanako" and each of the keyword vectors representing the respective keywords.

As a result, the content searching apparatus 100 figures out that keywords "Matsushita Taro, Kyoto, Historical drama, Temple, Samurai, Drama, Shogun, Tea ceremony, Whistle, War, Couple, History . . . " have a high relevance degree being equal to 0.7 or higher, keywords "Horse, motorcycle, America . . . " have a medium relevance degree being equal to 0.4 or higher and below 0.7, and keywords "Matsushita Kenji, adolescence, Guitar, Teacher, Quiz, Baseball . . . " have a low relevance degree of below 0.4.

Then, using an initial state relevance degree distribution= (3,1,1), for example, the content searching apparatus 100 selects, out of the keywords included in the target content table 108a, the three keywords having a high relevance degree "Matsushita Taro, Kyoto, and Historical drama", one of the keywords having a medium relevance degree "Horse", and one of the keywords having a low relevance degree "Matsushita Kenji". The content searching apparatus 100 displays the five relevant keywords as selected above.

FIG. 13 is a drawing detailing an example of content names and relevant keywords displayed by the content searching apparatus 100.

As shown in FIG. 13, for example, the content searching apparatus 100 includes the following: each of content names and content outlines "Content A: outline, Content B: outline, and Content C: outline" included in three respective content attributes each of which has the latest selection keyword "Matsushita Hanako"; the above-described five relevant keywords "Matsushita Taro, Kyoto, Historical drama, Horse, and Matsusita Kenji" which are relevant to the selection keyword "Matsushita Hanako"; and a help button Hb.

Here is supposed a following situation. Specifically, the user has already selected the relevant keywords "Drama, and Samurai" with the relevant keywords displayed as shown in FIG. 13. Then, the user selects the relevant keyword "Matsushita Hanako" at the latest moment. Here, the user gets confused since the user can find neither the user's desired content name in the displayed three content names as described above nor a desired keyword out of the displayed five relevant keywords. Thus the user operates the input unit 112 to select the help button Hb.

When the help button Hb is selected, the content searching apparatus 100 counts the number of the selection keywords stored in the selection keyword storing unit 103 "Drama, Samurai, and Matsushita Hanako", calculates a variance value of those selection keywords "Drama, Samurai, and Matsushita Hanako", and identifies a confusion type. For example, the content searching apparatus 100 judges that the number of the counted keywords "3" is smaller than a threshold value "5", and the calculated variance value "0.3" is smaller than a threshold value "0.5". As a result, the confusion type A is identified.

The confusion type A is detailed here.

The confusion type A is identified in the case where the number of selection keywords and the variance value of the selection keywords are small. A small variance value of selection keywords means that the user has selected relevant keywords each of which has a high relevance degree. At the beginning of a search, the user usually tries to find an initially assumed content, selecting a relevant keyword having a high relevance degree to the first selected keyword. Thus, the fact that the user actually selects the relevant keyword having a high relevance degree means that the relevance degrees, between the keywords, which the user assumes and the relevance degrees, between the keywords, formed by the target content table 108a approximately equal to each other. In other words, when the variance value of the selection keywords is small, the target content table 108a does not need to be changed.

Then, the fact that the user is confused when the number of the selection keywords and the variance value of these selection keywords are small means that the user desires to: give up the search of the content as soon as possible, the search which uses a keyword having a high relevance degree; and to search the content with a keyword having a low relevance degree. This is because the number of selection keywords should be large if the user did not give up the search of the content, the search which uses the relevant keyword having a high relevance degree.

In the example mentioned above, the user selects the relevant keywords each of which has a high relevance degree "Drama, Samurai, and Matsushita Hanako". Meanwhile, a relevant keyword having a high relevance degree which the user assumes is not displayed out of the relevant keywords, which are displayed by the selection and has a high relevance degree, "Matsushita Taro, Kyoto, and Historical drama", for example. Thus, the user gives up the content search as soon as possible, the content search which uses the relevant keyword having a high relevant ratio, in other words, the content search using the relevant content that the user has initially assumed. Then the user tries to search the content using one or more relevant keywords having a low relevance degree. Here, the user gets confused since the number of the keywords having a low relevance degree is small.

Hence, when the confusion type A is identified, the user's confusion can be solved by displaying many relevant keywords having a low relevance degree without changing the target content table 108a.

Thus, once identifying the content type A, the content searching apparatus 100 adjusts the relevance degree distribution without changing the target content table 108a. In other words, the content searching apparatus 100 adjusts the relevance distribution ratio in order for the keywords having a low relevance degree to be increasingly distributed. For example, the content searching apparatus 100 adjusts the initial state relevance degree distribution=(3,1,1) to relevance degree distribution=(1,2,2).

Then, the content searching apparatus 100 once again creates one or more relevant keywords based on the adjusted relevance degree distribution once again. For example, using the relevance degree distribution=(1,2,2), the content searching apparatus 100 selects, as relevant keywords, a keyword having a high relevance degree "Temple", two keywords having a medium relevant ratio "America, and Motorcycle", and two keywords having a low relevance degree "Guitar and Teacher", out of the keywords included in the target content table 108a shown in FIG. 12. The content searching apparatus 100 displays the five relevant keywords as selected above.

FIG. 14 is a diagram detailing an example of relevant keywords displayed after the confusion type A is identified.

As shown in FIG. 14, for example, the content searching apparatus 100 displays the following: three content names and content outlines "Content A: outline, Content B: outline, and Content C: outline" each of which is associated with the latest selection keyword "Matsushita Hanako"; five relevant keywords "Temple, America, Motorcycle, Guitar, and Teacher" which are relevant to the selection keyword "Matsushita Hanako"; and the help button Hb.

As described above, since the relevant keywords having a low relevance degree "Guitar, and Teacher" and the relevant keywords having a medium relevance degree "America and Motorcycle" are displayed a lot, the user can search a content, using a keyword having a small relevance degree to the keyword "Matsushita Hanako", in other words, using a keyword having a different viewpoint from the keyword "Matsushita Hanako". As a result, the user can solve the confusion to search the desired content.

Here is further supposed a following situation. Specifically, the user has already selected the relevant keywords "Guitar and Adolescence" with the relevant keywords displayed as shown in FIG. 13. Then, the user selects the relevant keyword "Matsushita Hanako" at the latest moment. Here, the user gets confused since the user can find neither a desired content name out of the three displayed content names nor a desired keyword out of the five displayed relevant keywords. Then, the user operates the input unit 112 to select the help button Hb.

When the help button Hb is selected, the content searching apparatus 100 counts the number of the selection keywords stored in the selection keyword storing unit 103 "Guitar, adolescence, and Matsushita Hanako", calculates a variance value of those selection keywords "Guitar, adolescence, and Matsushita Hanako", and identifies a confusion type. For example, the content searching apparatus 100 judges that the number of the counted keywords "3" is smaller than a threshold value "5", and the calculated variance value "0.8" is larger than a threshold value "0.5". As a result, the confusion type B is identified.

The confusion type B is detailed here.

The confusion type B is identified in the case where the number of selection keywords is small and the variance value of the selection keywords is large. A large variance value of selection keywords means that the user has selected relevant keywords each of which has a small relevance degree. At the beginning of a search, the user usually tries to find an initially assumed content, selecting a relevant keyword having a high relevance degree to the first selected keyword. Instead, the fact that the user actually selects a relevant keyword having a low relevance degree means that the relevance degrees, between the keywords, which the user assumes and the relevance degrees, between the keywords, which the target content table 108a forms do not equal to each other.

Thus, in order to solve the user's confusion, the relevance degrees, between the keywords, which the user assumes and the relevance degrees formed by the target content table 108a need to approximately equal to each other in the case where the variance value of the selection keywords is large. Specifically, the target content tale 108a needs to be changed.

Then, the fact that the user is confused when the number of the selection keywords is small and the variance value of these selection keywords are big means that the user has an interested content in mind; that is, the user is searching for the specific content. Meanwhile, the user finds the number of relevant keywords small, and desires those relevant keywords to be displayed as soon as possible. Here, the user assumes the relevance degrees of the relevant keywords to be high. The number of selection keywords should be large if the user had no purpose for the search.

In the above example, the user selects the relevant keywords "Guitar, adolescence, and Matsushita Hanako", each of which has a low relevance degree assuming that each of the relevant keywords has a high relevance degree. Then, the relevant keywords, which the user assumes, to have a large relevance degree are not displayed many since the content searching apparatus 100 recognizes the relevant keywords to have a low relevance degree. In other words, the user is in confusion, thinking that only relevant keywords assumed to have a low relevant ratio are displayed.

Hence, when the confusion type B is identified, the user's confusion can be solved by changing the target content table 108a to display many relevant keywords having a high relevance degree.

Then, once identifying the content type B, the content searching apparatus 100 changes the target content table 108a and adjusts the relevance degree distribution. Specifically, using the profile information 102a, the content searching apparatus 100 specifies a period in which the selection keyword "Matsushita Hanako" frequently appears, and designates a new content table 108a corresponding to the period. For example, the content searching apparatus 100 switches the target content table from the latest content table 108a of which service period is January through June, 2006 to a content table 108a of which service period is January through June, 2004. Furthermore, the content searching apparatus 100 adjusts relevance degree distribution in order for keywords having a high relevance degree to be increasingly distributed. For example, the content searching apparatus 100 adjusts the initial state relevance degree distribution=(3,1,1) to relevance degree distribution=(4,1,0).

In the embodiment, since the target content table 108a is changed based on the profile information 102a as described above, a period which the user assumes and the service period of the target content table 108a match, and thus, the relevance degrees between the keywords which the user has in mind and the relevance degrees formed by the target content table 108a can approximately equal to each other.

Figure 15:
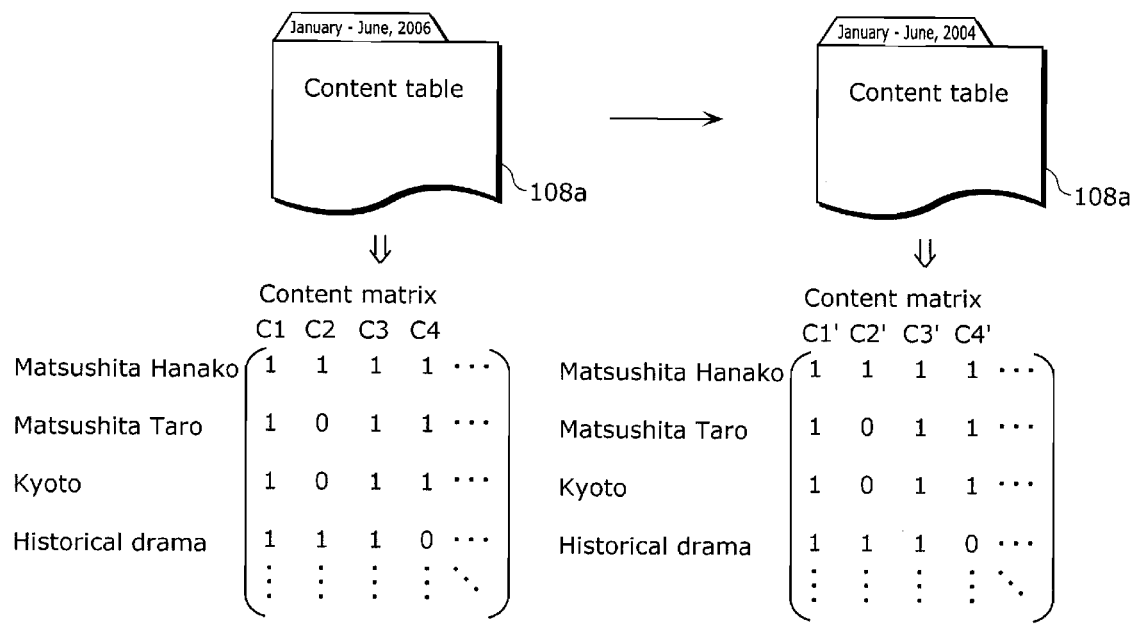
FIG. 15 is a diagram showing an example of the above content matrix being changed.

FIG. 15 is a drawing showing an example of a content matrix being changed.

The content searching apparatus 100 changes the target content table 108a from the content table 108a having "Service period: January through June, 2006" to the content table 108a having "Service period: January through June, 2004". As a result, the content searching apparatus 100 recreates a content matrix based on the new target content table 108a. Further, based on the recreated content matrix, the content searching apparatus 100 recalculates relevance degrees of respective keywords to the latest selection keyword "Matsushita Hanako".

FIG. 16 is a detailed example of relevance degrees, to respective keywords, being recalculated.

As shown in FIG. 16, the content searching apparatus 100 calculates, as described above, the relevance degrees of the respective keywords to the selection keyword "Matsushita Hanako", using the recreated content matrix shown in FIG. 15. As a result, the content searching apparatus 100 figures out that keywords "Matsushita Kenji, teacher, school, love, motorcycle . . . " have a high relevance degree equal to 0.7 or higher, keywords "Guitar, basketball, shoe, Spain . . . " have a medium relevance degree equal to 0.4 or higher and below 0.7, and keywords "ship, music . . . " have a low relevance degree of below 0.4.

Then, using the adjusted relevance degree distribution=(4, 1,0), the content searching apparatus 100 selects, out of the keywords included in the target content table 108a, the four keywords having a high relevance degree "Matsushita Kenji, teacher, school, and love", and one of the keywords having a medium relevance degree "Spain" as the relevant keyword. The content searching apparatus 100 displays the five relevant keywords as selected above.

FIG. 17 is a diagram detailing an example of relevant keywords displayed after the confusion type B is identified.

As shown in FIG. 17, for example, the content searching apparatus 100 displays the following: three content names and content outlines "content A: outline, content B: outline, and content C: outline" each of which is associated with the latest selection keyword "Matsushita Hanako"; five relevant keywords "Matsushita Kenji, teacher, school, love, and Spain" which are relevant to the selection keyword "Matsushita Hanako"; and the help button Hb.

Since many relevant keywords "Matsushita Kenji, teacher, school, and love", which the user assumes that the relevance degrees is high, are displayed, the user can solve the confusion by easily selecting one or more desired relevant keywords to facilitate a search for a desired content.

Here is further supposed a following situation. Specifically, the user has already selected the relevant keywords "drama, shogun, war, couple, and History" with the relevant keywords displayed as shown in FIG. 13. Then, the user selects the relevant keyword "Matsushita Hanako" at the latest moment. Here, the user gets confused since the user can find neither a desired content name out of the displayed three content names nor a desired keyword out of the displayed five relevant keywords. Then, the user operates the input unit 112 to selects the help button Hb.

When the help button Hb is selected, the content searching apparatus 100 counts the number of the selection keywords stored in the selection keyword storing unit 103 "drama, shogun, war, couple, History, and Matsushita Hanako", calculates a variance value of those selection keywords "drama, shogun, war, couple, History, and Matsushita Hanako", and identifies a confusion type. For example, in the case where the content searching apparatus 100 judges that the number of the counted keywords "6" is larger than a threshold value "5", and the calculated variance value "0.3" is smaller than a threshold value "0.5", the confusion type C is identified.

The confusion type C is detailed here.

The confusion type C is identified when the number of selection keywords is large, and the variance value of the selection keywords is small. A small variance value of selection keywords means the user selecting relevant keywords each of which has a high relevance degree. At the beginning of a search, the user usually tries to find an initially assumed content, selecting a relevant keyword having a high relevance degree to the first selected keyword. Hence, the fact that the user actually selects the relevance keywords having a high relevance degree means that the relevance degrees, between the keywords, which the user assumes and the relevance degrees, between the keywords, formed by the target content table 108a approximately equal to each other. Specifically, the target content tale 108a does not need to be changed when the variance value of the selection keywords is small.

Then, the fact that the user is confused when the number of the selection keywords is large, and the variance value of these selection keywords is small means that the user insists on searching a content with a keyword having a high relevance degree. This is because the number of selection keywords should be small if the user did not insist on searching the content using the relevant keyword having a high relevance degree.

In the above described example, for instance, the user has selected the relevant keywords each of which has a large relevant ratio "drama, shogun, war, couple, History, and Matsushita Hanako". However, the user finds it difficult for the user's assumed relevant keyword, having a high relevance degree, to be displayed for a content which the user tries to find. Then the user gets confused, since the number of the keywords having a low relevance degree is small.

Hence, when the confusion type C is identified, the user's confusion can be solved by avoiding changing the target content table 108a and by displaying many relevant keywords having a high relevance degree.

Thus, once specifying the content type C, the content searching apparatus 100 adjusts the relevance degree distribution without changing the target content table 108a. In other words, the content searching apparatus 100 adjusts the relevance distribution ratio in order for keywords having a high relevance degree to be increasingly distributed. For example, the content searching apparatus 100 adjusts the initial state relevance degree distribution=(3,1,1) to relevance degree distribution=(4,1,0).

The content searching apparatus 100 creates one or more relevant keywords based on the adjusted relevance degree distribution once again. For example, using the relevance distribution ratio=(4,1,0), the content searching apparatus 100 selects, out of the keywords included in the target content table 108a, the four keywords having a high relevance degree "Temple, samurai, Tea ceremony, and whistle", and one of the keywords having a medium relevance degree "America". The content searching apparatus 100 displays the five relevant keywords as selected above.

FIG. 18 is a diagram detailing an example of relevant keywords displayed after the confusion type C is identified.

As shown in FIG. 18, for example, the content searching apparatus 100 displays the following: three content names and content outlines "content A: outline, content B: outline, and content C: outline" each of which is associated with the latest selection keyword "Matsushita Hanako"; five relevant keywords "Temple, samurai, Tea ceremony whistle, and America" which are relevant to the selection keyword "Matsushita Hanako"; and the help button Hb.

Since many relevant keywords having a high relevance degree "Temple, samurai, Tea ceremony, and whistle" are displayed, the user can solve the confusion by easily selecting one or more desired relevant keywords to facilitate a search for a desired content.

Here is further supposed a following situation. Specifically, the user has already selected the relevant keywords "quiz, adolescence, Guitar, baseball, and Matsushita Kenji" with the relevant keywords displayed as shown in FIG. 13. Then, the user selects the relevant keyword "Matsushita Hanako" at the latest moment. Here, the user gets confused since the user can neither find a desired content name out of the displayed three content names nor a desired keyword out of the displayed five relevant keywords. Then, the user operates the input unit 112 to select the help button Hb.

When the help button Hb is selected, the content searching apparatus 100: counts the number of the selection keywords stored in the selection keyword storing unit 103 "quiz, adolescence, Guitar, baseball, Matsushita Kenji, and Matsushita Hanako"; calculates a variance value of those selection keywords "quiz, adolescence, Guitar, baseball, Matsushita Kenji, and Matsushita Hanako"; and identifies a confusion type. For example, in the case where the content searching apparatus 100 judges that the number of the counted keywords "6" is larger than a threshold value "5", and the calculated variance value "0.8" is larger than a threshold value "0.5", the confusion type D is identified.

The confusion type D is detailed here.

The confusion type D is identified in the case where the number of selection keywords and the variance value of the selection keywords are large. A large variance value of selection keywords means that the user has selected relevant keywords each of which has a small relevance degree. At the beginning of a search, the user usually tries to find an initially assumed content, selecting a relevant keyword having a high relevance degree to the first selected keyword. Here, the fact that the user actually selects a relevant keyword having a low relevance degree means that the relevance degrees between the keywords which the user assumes and the relevance degrees, between the keywords, which the target content table 108*a* creates do not equal to each other.

Thus, in order to solve the user's confusion, the relevance degrees, between the keywords, which the user assumes and the relevance degrees, between the keywords, which the target content table 108*a* creates need to approximately equal to each other when the variance value of the selection keywords is large. Specifically, the target content tale 108*a* needs to be changed.

Then, the fact that the user is confused when the number of the selection keywords and the variance value of these selection keywords are large means that the user has no interested content in mind; that is, the user is browsing contents with no particular content in mind, and thus desires to search a content over a wide range, utilizing a search with relevant keywords having a small relevance degree, as well. This is because the number of selection keywords should be small if the user had a target content for the search.

In the above example, the user selects at the beginning of the search the relevant keywords each of which has a low relevance degree "quiz, adolescence, and Guitar", assuming that each of the relevant keywords has a high relevance degree. Then, with no target content in mind, the user thinks of searching a content in a wide range, and continues selecting the relevant keywords each of which has a low relevance degree, "baseball, Matsushita Kenji, and Matsushita Hanako". However, there are not many relevant keywords having a low relevance degree displayed. Thus, the user gets confused, thinking that the content search over the wide range is impossible.

Hence, when the confusion type D is identified, the user's confusion can be solved by changing the target content table 108*a* to display many relevant keywords having a low relevance degree.

Then, once identifying the confusion type D, the content searching apparatus 100 changes the target content table 108*a* and adjusts the relevance degree distribution. When changing the target content table 108*a* the content searching apparatus 100 changes, as described above, the target content table 108*a* from the content table 108*a* having "Service period: January through June, 2006" to the content table 108*a* having "Service period: January through June 2004", shown in FIG. 15 for example.

In the embodiment, since the target content table 108*a* is changed based on the profile information 102*a* as described above, a period which the user assumes and the service period of the target content table 108*a* match, and thus, the relevance degrees, between the keywords, which the user supposes and the relevance degrees formed by the target content table 108*a* can approximately equal to each other.

Further, based on the new target content table 108*a*, the content searching apparatus 100 recreates a content matrix. According to the recreated content matrix, the content searching apparatus 100 recalculates relevance degrees of respective keywords to the latest selection keyword "Matsushita Hanako", as shown in FIG. 16. As a result, the content searching apparatus 100 figures out that keywords "Matsushita Kenji, teacher, school, love, motorcycle . . . " have a high relevance degree equal to 0.7 or higher, keywords "Guitar, basketball, shoe, Spain . . . " have a medium relevance degree equal to 0.4 or higher and below 0.7, and keywords "ship, music . . . " have a low relevance degree of below 0.4.

The content searching apparatus 100 also adjusts the relevance degree distribution in order for keywords having a low relevance degree to be increasingly distributed when adjusting the relevance degree distribution. For example, the content searching apparatus 100 adjusts the initial state relevance degree distribution=(3,1,1) to relevance degree distribution= (1,2,2).

Then, the content searching apparatus 100 selects, out of the keywords included in the target content table 108*a* shown in FIG. 16, one of the keywords having a high relevance degree "teacher", two of the keywords having a medium relevance degree "basketball, and shoe", and two of the keywords having a low relevance degree "ship, and music" as relevant keywords. The content searching apparatus 100 displays the five relevant keywords as selected above.

Figure 19:
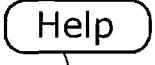
FIG. 19 is a diagram detailing an example of relevant keywords displayed after a confusion type D included in the above confusion types is specified.

FIG. 19 is a diagram detailing an example of related keywords after the confusion type D is identified.

As shown in FIG. 19, for example, the content searching apparatus 100 displays the following: three content names and content outlines "content A: outline, content B: outline, and content C: outline" each of which is associated with the latest selection keyword "Matsushita Hanako"; five relevant keywords "teacher, Basket ball, shoe, ship, and music" which are associated with the selection keyword "Matsushita Hanako"; and the help button Hb.

There are displayed many relevant keywords, which the user assumes, to have a low relevance degree "ship, and music" as described above. Thus, the user can solve the confusion by searching an interested content over a wide range.

In the embodiment, as mentioned above, when the user gets confused finding a content, the confusion type is identified to change the target content table 108*a* and adjust the relevance degree distribution, according to the confusion type. As a result, relevant keywords which the user desires can be appropriately displayed to facilitate a search for a content which the user desires even when relevancy between a content and a keyword changes.

The content searching apparatus of the present invention has been described in the above embodiment; however, the present invention shall not be limited to the embodiment.

In the embodiment, for example, the selection of the help button Hb by the user calculates relevance degrees of respective keywords to the latest selection keyword to create relevance keywords. Instead, relevance degrees to another selection keyword than the latest selection keyword may be calculated. Moreover, a representative keyword may be created out of all the selection keywords stored in the selection keyword storing unit 103, and then a relevance degree to the keyword may be calculated. Here, the content searching apparatus calculates a centroid of keyword vectors each of which represents all of selection keywords, respectively, and specifies the closest keyword vector to the centroid. Then the content searching apparatus calculates a relevance degree of the other keyword to the specified keyword vector to create a relevant keyword.

Upon the user getting confused, this can create an appropriate relevant keyword associated with a user's desired keyword even when the latest selection keyword is not the user's desired keyword.

Moreover, in the embodiment, the output creating unit 110 adds the watch history to the profile information 102a when obtaining the content ID from the input judging unit 101 and outputting an associated content with the content ID to the displaying unit 111; instead, the output creating unit 110 may add the watch history when the content is reproduced for a period of time or more. For example, even though the user selects a content to start reproduction, the user actually stops the reproduction in the middle once the user watches the content to find the content uninterested. In the above case, as well, addition of the watch history to the profile information 102a does not accurately reflect the user's preference to the profile information 102a. Thus, an appropriate target content table 108a using the profile information 102a cannot be set. Thus, the output creating unit 110 outputs the content to the displaying unit 111, and adds the content watch history to the profile information 102a only when the content is reproduced for a period of time or more. This increases reliability to the profile information 102a and sets an appropriate target content table 108a, so that an appropriate relevant keyword which the user desires can be displayed.

In addition, only the content table 108a is stored in the content table storing unit 108 in the embodiment; instead, a content associated with a content attribute shown by the content table 108a may also be stored.

Moreover, in the embodiment, the relevant keyword creating unit 109 outputs all the created relevant keywords to the output creating unit 110; instead, only some of all the relevant keywords may be outputted to the output creating unit 110 to be displayed. For example, the relevant keyword generating unit 109 outputs only relevant keywords each of which has the same attribute as that of the selection keyword. The attribute of the selection keyword includes a name of a person, place, and an adjective. Further, the selection keyword may include the latest selection keyword, as well as another keyword other than the latest selection keyword, the other keyword which is stored in the selection keyword storing unit 103. In addition, the relevant keyword generating unit 109 may output relevant keywords having an attribute. The attribute is identical to a frequently appearing attribute out of attributes of all the respective selection keywords stored in the selection keyword storing unit 103. This allows a more appropriate relevant keyword which the user desires to be displayed since the attribute of the relevant keyword which the user desires is probably the frequently appearing attribute.

Moreover, in the embodiment, when selecting a keyword from the target content table 108a to create a relevant keyword, the relevant keyword creating unit 109 avoids selecting an identical keyword to the relevant keyword which has already been created to be displayed, and selects another keyword; instead, the relevant keyword creating unit 109 may select the identical keyword.

Further, in the embodiment, the content table selecting unit 114 specifies, in the profile information 102a, a period in which the latest selection keyword frequently appears, and selects a content table 108a corresponding to the period as a new target content table. Instead, the content table selecting unit 114 may specify, in the profile information 102a, the latest date on which the latest selection keyword appears, and select a content table 108a corresponding to a period including the date as a new target content table. For example, in the case where the latest selection keyword is "Matsushita Hanako", the content table selecting unit 114 searches in the profile information 102a a watch history attribute including the selection keyword "Matsushita Hanako", and specifies the latest date, Mar. 10, 2005, for example, out of dates included in the watch history attribute, for example. Then, the content table selecting unit 114 selects the content table 108a of which service period "January through June, 2005", including the date Mar. 10, 2005, as a new target content table.

In general, the more lately a content is watched, the more likely the user memorizes the content among contents watched in the past. Thus, the content table 108a, corresponding to the period including the latest date on which the selection keyword appears, is changed to a target content table, using the profile information 102a, so that an appropriate keyword which the user desires can be displayed.

In addition, in the embodiment, the relevance degree distribution is adjusted. Instead of the relevance degree distribution, threshold values (0.4 and 0.7 described above) for classifying into a high relevance degree, a medium relevance degree, and a low relevance degree may be adjusted.

Moreover, in the embodiment, the user's confusion is detected when the user operates to select the help button Hb; instead, the user's confusion may be detected for example when a period of time, for which a selection of a relevant keyword is stopped, elapses.

Further, elements included in the content matrix may be weighted. Among the keywords included in a content, there are some keywords closely associated with the content, and there are other keywords having little relevancy to the content, all of which are mixed. Here, the elements of the content matrix are to be weighted utilizing, for example, frequency of a keyword included in a content attribute, so that degree of a keyword relevance degree for representing the content can be reflected on the content matrix. This allows a relevance degree between keywords to be calculated as a more closely associated value with the content.

INDUSTRIAL APPLICABILITY

The content searching apparatus in the present invention is effective in facilitating a search of a content which a user desires even where relevance between the content and the keyword of the content changes. For example, the present invention is useful as a searching apparatus to search a content, which a user desires to watch, out of significant numbers of contents stored in a server. The contents can be of any kind, including: an audio-visual content such as a TV program, a movie, and music; and a text content such as a book, and a paper.

The invention claimed is:

1. A content searching apparatus, which searches for a content in a form of electronic data based on a keyword selected by a user, said content searching apparatus comprising:
   a content table storing unit including a memory storing a plurality of content tables, each respective content table of the plurality of content tables including a plurality of pieces of identification information, a plurality of keywords and a plurality of content names, and each respective content table of the plurality of content tables associating each of the plurality of pieces of identification information with (i) at least one keyword of the plurality of keywords, and (ii) a content name of the plurality of content names, such that each of the plurality of keywords is associated with at least one content name of the plurality of content names and such that each of the plurality of pieces of identification information identifies a content name of the plurality of content names;
   an input unit designating, as a target content table, a content table selected from the plurality of content tables, and obtaining, as a selection keyword, a keyword selected, from the plurality of keywords shown in of the target content table, by an input operation of the user;
   a relevant keyword creating unit (i) creating a respective relevance degree for each of the plurality of keywords of the target content table associated with the selection keyword, each relevance degree being calculated based on correspondence relationship between each of the plurality of pieces of the identification information and each of the plurality of keywords of the target content table, and (ii) selecting, as a relevant keyword and from the plurality of keywords associated with the selection keyword, a keyword having a relevance degree of a predetermined value;
   a confusion receiving unit receiving information provided by the user indicating that the user is in confusion, when the user is in confusion;
   a variance calculating unit calculating a variance degree of selection keywords including the selection keyword and other selection keywords obtained by said input unit, the variance degree being calculated (i) using each relevance degree calculated for the selection keywords as a scale, and (ii) based on the information provided from the user by said confusion receiving unit and indicating that the user is in confusion; and
   a content table selecting unit selecting, from the plurality of content tables of said content table storing unit, a content table other than the target content table, when the calculated variance degree is larger than a variance threshold value, and setting the content table selected by said content table selecting unit as a new target content table.

2. The content searching apparatus according to claim 1, further comprising:
   a counting unit counting a number of the selection keywords obtained by said input unit, when the information provided from the user by said confusion receiving unit indicates that the user is in confusion; and
   an adjusting unit adjusting a number of the relevant keywords to be selected by said relevant keyword creating unit, the adjusting being based on the number of the selection keywords counted by said counting unit and based on a predetermined relevance degree.

3. The content searching apparatus according to claim 2, wherein the content searching apparatus includes a confused state judging unit judging whether the variance degree, calculated by said variance calculating unit, is larger or smaller than the variance threshold value, and judging whether the number of the selection keywords counted by said counting unit is larger or smaller than a threshold value of a number of keywords, and
wherein, when said confused state judging unit judges the variance degree to be smaller and the number of the selection keywords to be smaller:
   said content table selecting unit does not set the new target content table; and
   said adjusting unit adjusts the number of the relevant keywords to be selected, such that a larger number of keywords having a lower relevance degree are selected as the relevant keywords.

4. The content searching apparatus according to claim 2, wherein the content searching apparatus includes a confused state judging unit judging whether the variance degree, calculated by said variance calculating unit, is larger or smaller than the variance threshold value, and judging whether the number of the selection keywords counted by said counting unit is larger or smaller than a threshold value of a number of keywords,
wherein, when said confused state judging unit judges the variance degree to be larger and the number of the selection keywords to be smaller:
   said content table selecting unit sets a content table of the plurality of content tables, other than the target content table, as the new content table; and
   said adjusting unit adjusts the number of the relevant keywords to be selected, such that a larger number of keywords having a higher relevance degree are selected as the relevant keywords.

5. The content searching apparatus according to claim 2, wherein the content searching apparatus includes a confused state judging unit judging whether the variance degree, calculated by said variance calculating unit, is larger or smaller than the variance threshold value, and judging whether the number of the selection keywords counted by said counting unit is larger or smaller than a threshold value of a number of keywords,
wherein, when said confused state judging unit judges the variance degree to be smaller and the number of the selection keywords to be larger:
   said content table selecting unit does not set the new target content table; and
   said adjusting unit adjusts the number of the relevant keywords to be selected, such that a larger number of keywords having a higher relevance degree are selected as the relevant keywords.

6. The content searching apparatus according to claim 2, wherein the content searching apparatus includes a confused state judging unit judging whether the variance degree, calculated by said variance calculating unit, is larger or smaller than the variance threshold value, and judging whether the number of the selection keywords counted by said counting unit is larger or smaller than a threshold value of a number of keywords,
wherein, when said confused state judging unit judges the variance degree to be larger and the number of the selection keywords to be larger:
   said content table selecting unit sets a content table of the plurality of content tables, other than the target content table, as the new content table; and said adjusting unit adjusts the number of the relevant keywords to be selected, such that a larger number of keywords having a lower relevance degree are selected as the relevant keywords.

7. The content searching apparatus according to claim 1, further comprising a profile information storing unit storing profile information indicating a preference of the user,
wherein said content table selecting unit selects a content table, of the plurality of content tables, that is associated with the preference of the user indicated in the profile information.

8. The content searching apparatus according to claim 7, wherein each respective content table of the plurality of content tables stored in said content table storing unit stores a respective plurality of pieces of identification information identifying contents provided during a specific period and the plurality of keywords associated therewith, such that each respective content table of the plurality of content tables is related to a different specific period.

9. A content searching method of using a storing unit to search for a content in a form of electronic data based on a keyword selected by a user,
wherein the storing unit stores a plurality of content tables, each respective content table of the plurality of content tables including a plurality of pieces of identification information, a plurality of keywords and a plurality of content names, and each respective content table of the plurality of content tables associating, each of the plurality of pieces of identification information with (i) at least one keyword of the plurality of keywords, and (ii) a content name of the plurality of content names, such that each of the plurality of keywords is associated with at least one content name of the plurality of content names and such that each of the plurality of pieces of identification information identifies a content name of the plurality of content names, and
wherein said content searching method includes:
an input step of designating, as a target content table, a content table selected from the plurality of content tables, and obtaining, as a selection keyword, a keyword selected, from the plurality of keywords of the target content table, by an input operation of the user;
a relevant keyword creating step of (i) creating a respective relevance degree for each of the plurality of keywords of the target content table associated with the selection keyword, each relevance degree being calculated based on correspondence relationship between each of the plurality of pieces of the identification information and each of the plurality of keywords of the target content table, and (ii) selecting, as a relevant keyword and from the plurality of keywords associated with the selection keyword, a keyword having a relevance degree of a predetermined value;
a confusion receiving step of receiving information provided by the user indicating that the user is in confusion, when the user is in confusion;
a variance calculating step of calculating a variance degree of selection keywords including the selection keyword and other selection keywords obtained by said input unit, the variance degree being calculated (i) using each relevance degree calculated for the selection keywords as a scale, and (ii) based on the information provided by the user by said confusion receiving step and indicating that the user is in confusion; and
a content table selecting step of selecting, from the plurality of content tables of the storing unit, a content table other than the target content table, when the calculated variance degree is larger than a variance threshold value, and setting the content table selected by said content table selecting step as a new target content table.

10. A non-transitory computer-readable recording medium having a program recorded thereon,
wherein the program is for using a storing unit to search for a content in a form of electronic data based on a keyword selected by a user
wherein the storing unit stores a plurality of content tables, each respective content table of the plurality of content tables including a plurality of pieces of identification information, a plurality of keywords and a plurality of content names, and each respective content table of the plurality of content tables associating each of the plurality of pieces of identification information with (i) at least one keyword of the plurality of keywords, and (ii) a content name of the plurality of content names, such that each of the plurality of keywords is associated with at least one content name of the plurality of content names and such that each of the plurality of pieces of identification information identifies a content name of the plurality of content names, and
wherein the program causes a computer to execute a content searching method comprising:
an input step of designating, as a target content table, a content table selected from the plurality of content tables, and obtaining, as a selection keyword, a keyword selected, from the plurality of keywords of the target content table, by an input operation of the user;
a relevant keyword creating step of (i) creating a respective relevance degree for each of the plurality of keywords of the target content table associated with the selection keyword, each relevance degree being calculated based on correspondence relationship between each of the plurality of pieces of the identification information and each of the plurality of keywords of the target content table, and (ii) selecting, as a relevant keyword and from the plurality of keywords associated with the selection keyword, a keyword having a relevance degree of a predetermined value;
a confusion receiving step of receiving information provided by the user indicating that the user is in confusion, when the user is in confusion;
a variance calculating step of calculating a variance degree of selection keywords including the selection keyword and other selection keywords obtained by said input unit, the variance degree being calculated (i) using each relevance degree calculated for the selection keywords as a scale, and (ii) based on the information provided by the user by said confusion receiving step and indicating that the user is in confusion; and
a content table selecting step of selecting, from the plurality of content tables of the storing unit, a content table other than the target content table in the storing unit in the case, when the calculated variance degree is larger than a variance threshold value, and setting the content table selected by said content table selecting step as a new target content table.

* * * * *